(12) United States Patent
Headings et al.

(10) Patent No.: US 7,673,784 B2
(45) Date of Patent: Mar. 9, 2010

(54) HIGH PRODUCTION WELDING FIXTURE

(75) Inventors: Robert Scott Headings, Richmond Hts., OH (US); Charles W. Hayes, II, Wickliffe, OH (US); Jeffrey M. Kalman, Cleveland Hts., OH (US); Craig Mizer, Stow, OH (US); Marc L. Vitantonio, South Russell, OH (US); Peter M. Oyster, Stow, OH (US)

(73) Assignee: Swagelok Company, Solon, OH (US)

( * ) Notice: Subject to any disclaimer, the term of this patent is extended or adjusted under 35 U.S.C. 154(b) by 1277 days.

(21) Appl. No.: 11/008,663

(22) Filed: Dec. 9, 2004

(65) Prior Publication Data

US 2006/0016857 A1    Jan. 26, 2006

Related U.S. Application Data

(60) Provisional application No. 60/481,760, filed on Dec. 9, 2003, provisional application No. 60/560,931, filed on Apr. 9, 2004.

(51) Int. Cl.
*B23K 37/00* (2006.01)
*B23K 37/053* (2006.01)

(52) U.S. Cl. .............. 228/44.3; 228/44.5; 228/212; 219/60 A; 219/90; 269/6

(58) Field of Classification Search ............. 228/59, 228/44.3, 44.5, 29, 212; 219/60 A, 90; 269/5, 269/6, 41, 43, 77, 82, 84, 85, 91, 97, 249
See application file for complete search history.

(56) References Cited

U.S. PATENT DOCUMENTS

| | | | |
|---|---|---|---|
| 3,596,898 A | 8/1971 | Hilburn | |
| 3,636,294 A | 1/1972 | Peyrot | |
| 3,668,359 A * | 6/1972 | Emmerson | 219/60 A |
| 4,698,474 A | 10/1987 | Gugel et al. | |
| 5,040,716 A | 8/1991 | Stetz | |
| 5,136,134 A * | 8/1992 | Benway et al. | 219/60 A |
| 5,220,144 A * | 6/1993 | Jusionis | 219/60 A |
| 5,655,699 A | 8/1997 | McGushion | |
| 5,679,271 A * | 10/1997 | Guerrina | 219/60 A |
| 6,355,899 B1 * | 3/2002 | Kane et al. | 219/60 A |
| 6,380,505 B1 | 4/2002 | Stoops et al. | |
| 6,646,219 B2 * | 11/2003 | Kane et al. | 219/60 A |
| 6,729,529 B2 | 5/2004 | Cecil et al. | |

FOREIGN PATENT DOCUMENTS

GB    763 282    12/1956

OTHER PUBLICATIONS

International Search Report for PCT/US2004/041576.

* cited by examiner

*Primary Examiner*—Jessica L. Ward
*Assistant Examiner*—Michael Aboagye
(74) *Attorney, Agent, or Firm*—Calfee, Halter & Griswold LLP

(57) ABSTRACT

A welding fixture for supporting first and second workpieces in a coaxial relationship along a workpiece axis relative to each other includes a base, a left clamp on the base for holding a first workpiece, and a right clamp on the base for holding a second workpiece on an opposite side of a welding plane in a coaxial relationship with the first workpiece. The fixture also includes a left handle on the base for operating the right clamp, and a right handle on the base for operating the left clamp.

32 Claims, 18 Drawing Sheets

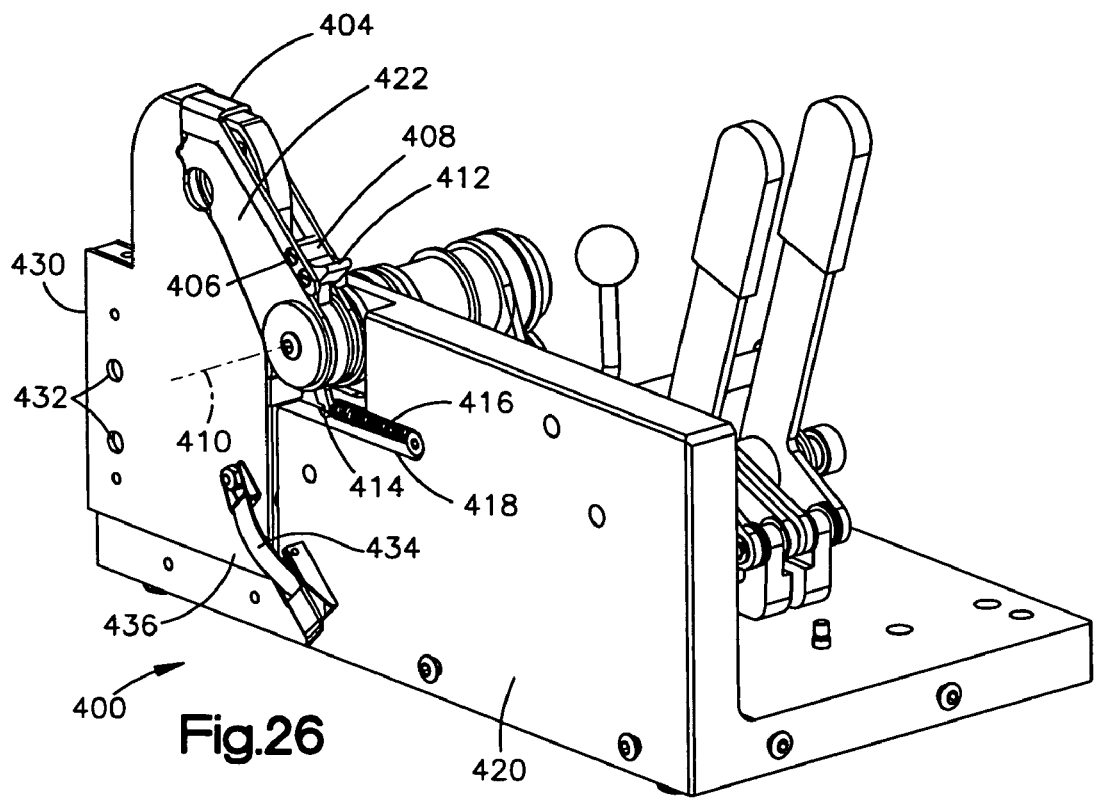
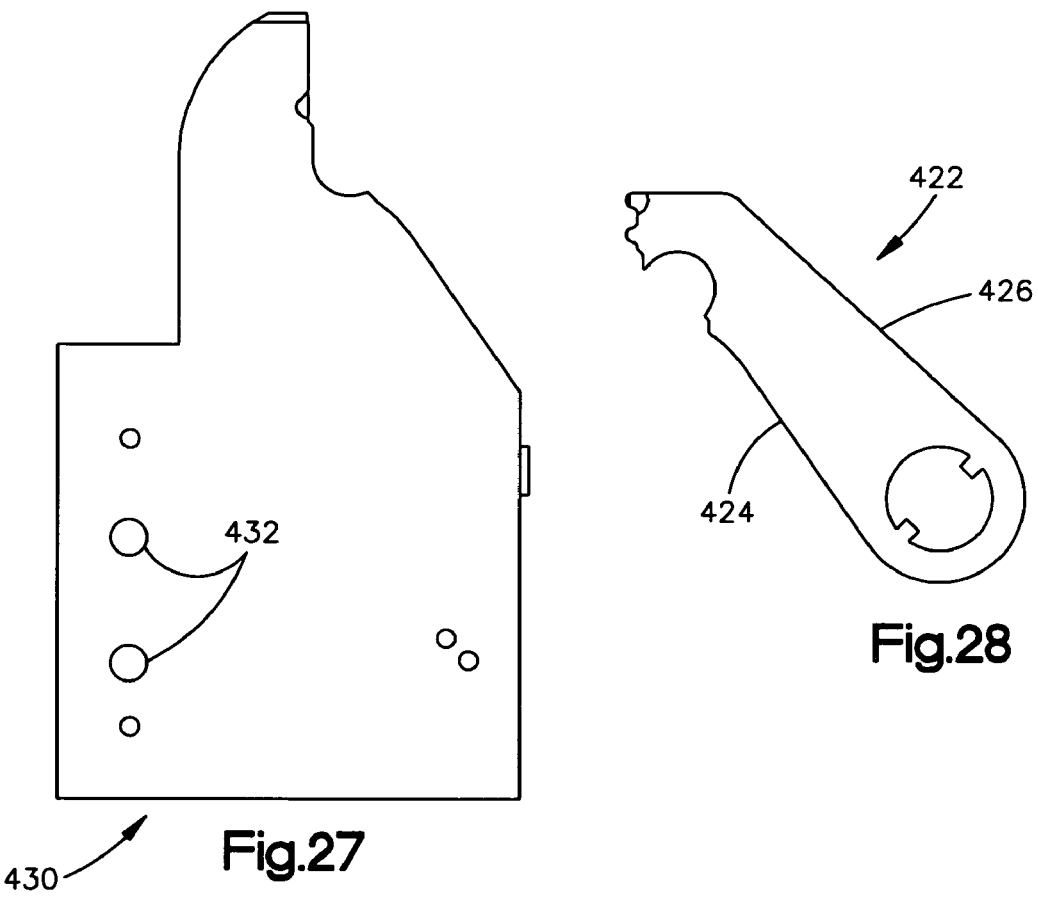

HIGH PRODUCTION WELDING FIXTURE

RELATED APPLICATIONS

This application claims the benefit of the filing dates of U.S. Provisional Application No. 60/481,760 filed Dec. 9, 2003 and U.S. Provisional Application No. 60/560,931 filed Apr. 9, 2004. Both of said applications are incorporated by reference.

BACKGROUND OF THE INVENTION

It is known to use orbital weld heads to weld tubes and tube fitting elements. A fixture is used to clamp the workpieces that are to be welded. Welding at high rates produces a substantial amount of heat in the weld head and fixture, potentially causing the user difficulty in clamping the workpieces before welding and in unclamping workpieces that have been welded. Some fixtures can require the user to manipulate directly the movable clamps when securing the workpiece(s). This exposes the user to potentially hot surfaces, and thus can require the use of gloves or extra tools, or a cooling down period. This is not conducive to high welding rates.

Additionally, some fixture designs do not promote quick loading and unloading of workpieces, which is necessary for higher production welding. Some designs also do not provide an easy and accurate way of supporting the workpiece with one hand and clamping it with the opposite hand, without coming close to hot fixture surfaces.

SUMMARY OF THE INVENTION

In one aspect the invention relates to a welding fixture for supporting first and second workpieces in a coaxial relationship along a workpiece axis relative to each other. The fixture includes a base, a left clamp on the base for holding a first workpiece, and a right clamp on the base for holding a second workpiece on an opposite side of a welding plane in a coaxial relationship with the first workpiece. The fixture also includes a left handle on the base for operating the right clamp, and a right handle on the base for operating the left clamp.

In another aspect, the invention relates to a welding fixture for supporting first and second workpieces in a coaxial relationship along a workpiece axis and on opposite sides of a welding plane relative to each other. The fixture includes a base, a first clamp on the base for holding a first workpiece, and a second clamp on the base for holding a second workpiece in a coaxial relationship with the first workpiece on an opposite side of the welding plane. The first and second clamps include first and second movable clamp parts, respectively, that are pivotable about a pivot axis separate from the workpiece axis. A first handle is on the base for operating the first clamp. A shaft is supported on the base for rotation about the pivot axis, the shaft connecting the first handle in a force-transmitting relationship with the first movable clamp part. A second handle is on the base for operating the second clamp. A sleeve is rotatable about the shaft and about the pivot axis, the sleeve connecting the second handle in a force-transmitting relationship with the second movable clamp part.

In still another aspect, the invention relates to a welding fixture for supporting first and second workpieces in a coaxial relationship along an axis and on opposite sides of a welding plane relative to each other. The fixture includes a base, a first clamp on the base for holding a first workpiece, and a second clamp on the base for holding a second workpiece in a coaxial relationship with the first workpiece on an opposite side of the welding plane. A first handle is on the base for operating the first clamp, and a second handle is on the base for operating the second clamp. The first handle and the second handle are on the same side of the welding plane as the second clamp, the first clamp being on the opposite side of the welding plane, and the fixture including a mechanism for transmitting actuating force from the first handle across the welding plane to the first clamp.

In yet another aspect, the invention relates to a welding fixture for supporting first and second workpieces in a coaxial relationship along a workpiece axis relative to each other. The fixture includes a base, a first clamp on the base having a closed position for holding a first workpiece and having an open position, and a second clamp on the base having a closed position for holding a second workpiece in a coaxial relationship with the first workpiece and having an open position, the second clamp being movable independently of the first clamp part. An arc shield is supported on the base for pivotal movement between a shielding position covering the welding location and a non-shielding position. The arc shield moves from the shielding position to the non-shielding position when either one of the first and second clamps is moved from the closed position to the open position, the arc shield being blocked from movement from the non-shielding position to the shielding position if either one of the first and second clamps is in the open position.

In a further aspect, the invention relates to welding apparatus including an orbital welder including an electrode rotatable about an axis in a welding plane to effect welding of first and second workpieces along the welding plane. The welding apparatus also includes a welding fixture for supporting the first and second workpieces in a coaxial relationship along the axis and on opposite sides of the a welding plane relative to each other. The fixture includes a base, a first clamp on the base for holding a first workpiece, and a second clamp on the base for holding a second workpiece in a coaxial relationship with the first workpiece on an opposite side of the welding plane. The fixture also includes a first handle on the base for operating the first clamp, and a second handle on the base for operating the second clamp, the first handle and the second handle being on the same side of the welding plane as the second clamp, the first clamp being on the opposite side of the welding plane, and the fixture including a mechanism for transmitting actuating force from the first handle across the welding plane to the first clamp.

In a still further aspect, the invention relates to a method of fixturing first and second workpieces in a coaxial relationship for welding by an orbital welder that has a welding electrode rotatable in a welding plane about an axis. The method includes the steps of:

moving a first handle to move a first movable clamp member to clamp the first workpiece on a first axial side of the welding plane; and moving a second handle to move a second movable clamp member to clamp the second workpiece on a second axial side of the welding plane;

wherein the steps of moving a first handle and moving a second handle are performed on the second axial side of the welding plane.

In yet another aspect, the invention relates to a method of welding first and second workpieces in a coaxial relationship on opposite axial sides of a welding plane with a welding electrode rotatable in the welding plane about the axis, the method comprising the steps of:

placing the first workpiece on a first axial side of the welding plane;

moving a first handle on a second axial side of the welding plane to clamp the first workpiece;

placing the second workpiece on the second axial side of the welding plane;

moving a second handle on the second axial side of the welding plane to clamp the second workpiece; and rotating a welding electrode in the welding plane about the axis to effect welding of the first and second workpieces at the welding plane.

BRIEF DESCRIPTION OF THE DRAWINGS

FIG. 26 is another perspective view of the welding fixture of FIG. 25;

FIG. 27 is an elevational view of a side plate that forms part of the welding fixture of FIG. 25; and FIG. 28 is an elevational view of a movable clamp plate that forms part of the welding fixture of FIG. 25.

DETAILED DESCRIPTION OF THE INVENTION

Figure 1:
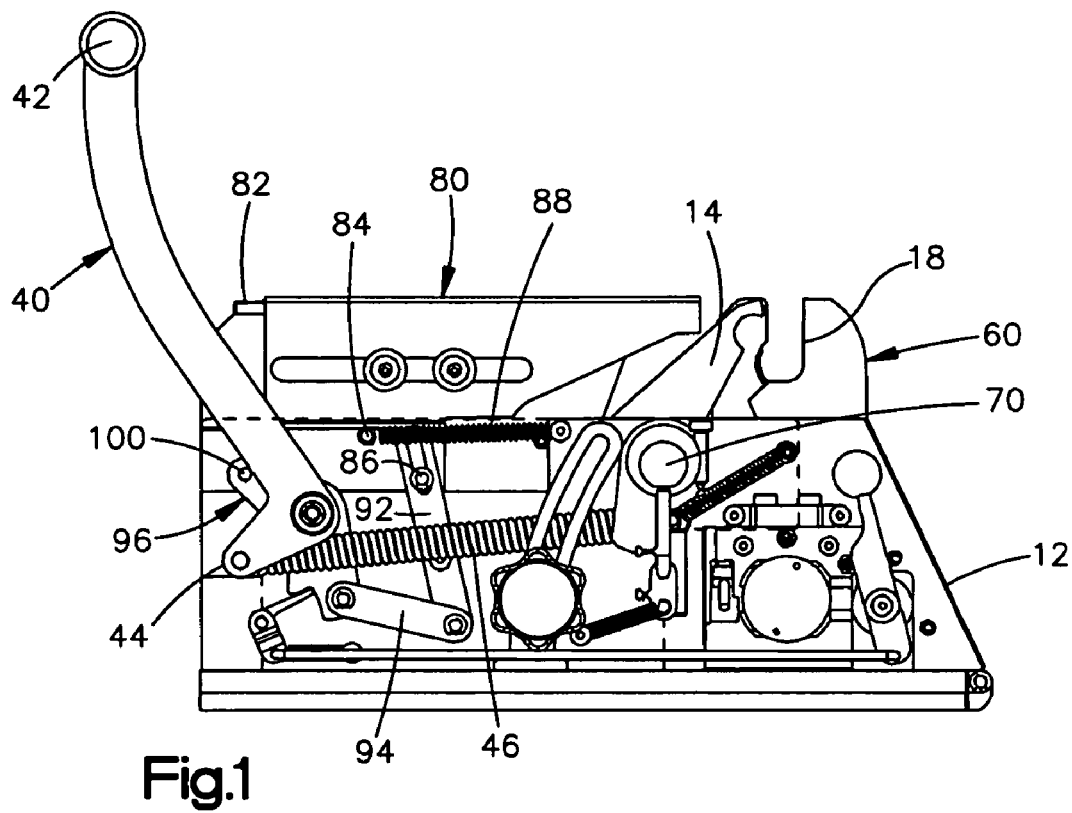
FIG. 1 is a side elevational view of the fixture that is a first embodiment of the invention, showing the handles and the clamps in the open or load position.

This application relates to welding fixtures for supporting workpieces in a welding process, such as orbital welding. The invention is applicable to fixtures of various differing constructions, some of which are shown herein as exemplary embodiments. As one example, FIG. 1 illustrates a fixture 10 that is a first embodiment of the invention.

Figure 4:
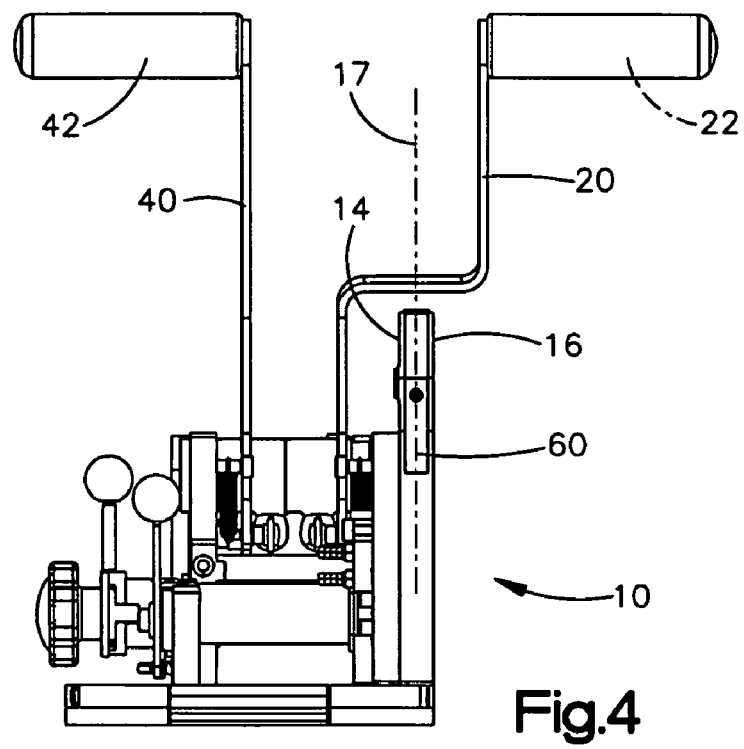
FIG. 4 is a front elevational view of the fixture.

The fixture 10 includes a base 12 that supports a left clamp 14 and a right clamp 16. The terms left and right are used herein to designate the positions of the clamps 14 and 16 as seen from the front end of the assembly 10, for example, as viewed in FIG. 4. The left and right clamps 14 and 16 are disposed on opposite sides of a welding plane 17, which is the plane in which a welding electrode of a weld head 60 rotates about an axis to effect welding of the two workpieces along the welding plane. Each one of the left and right clamps 14 and 16 holds a respective one of the two workpieces to be welded together, against a fixed jaw 18.

Figure 5:
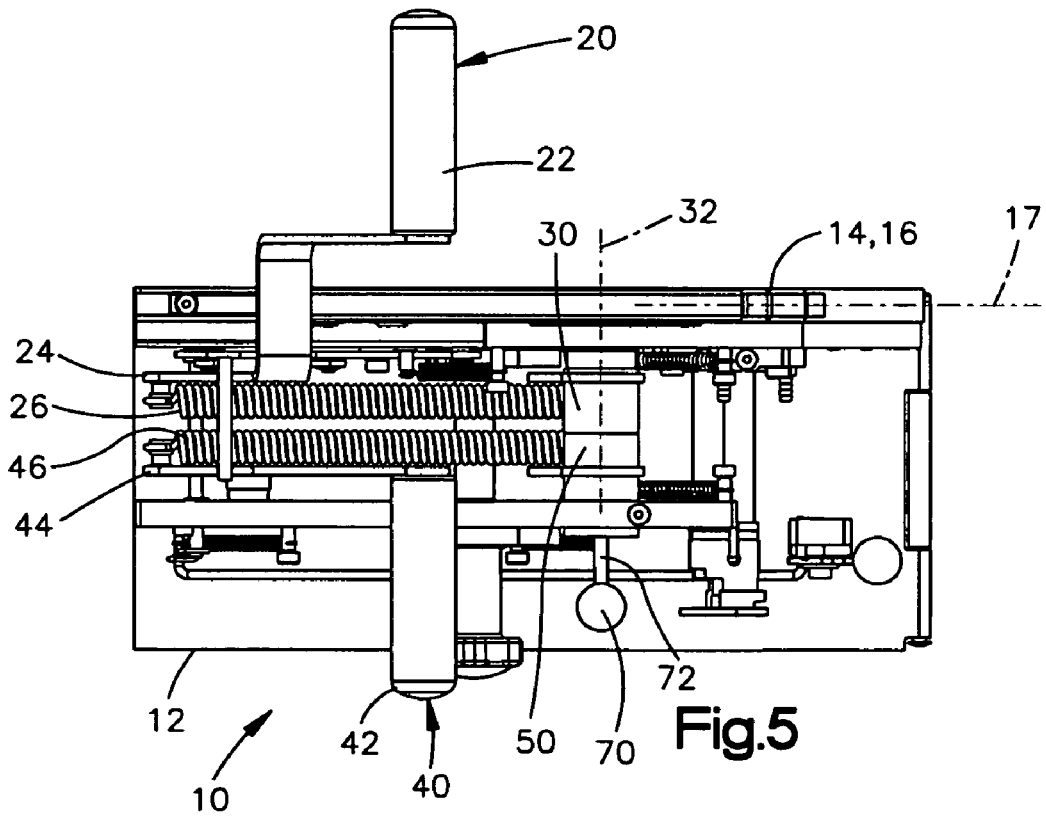
FIG. 5 is a top plan view of the fixture.
Figure 6:
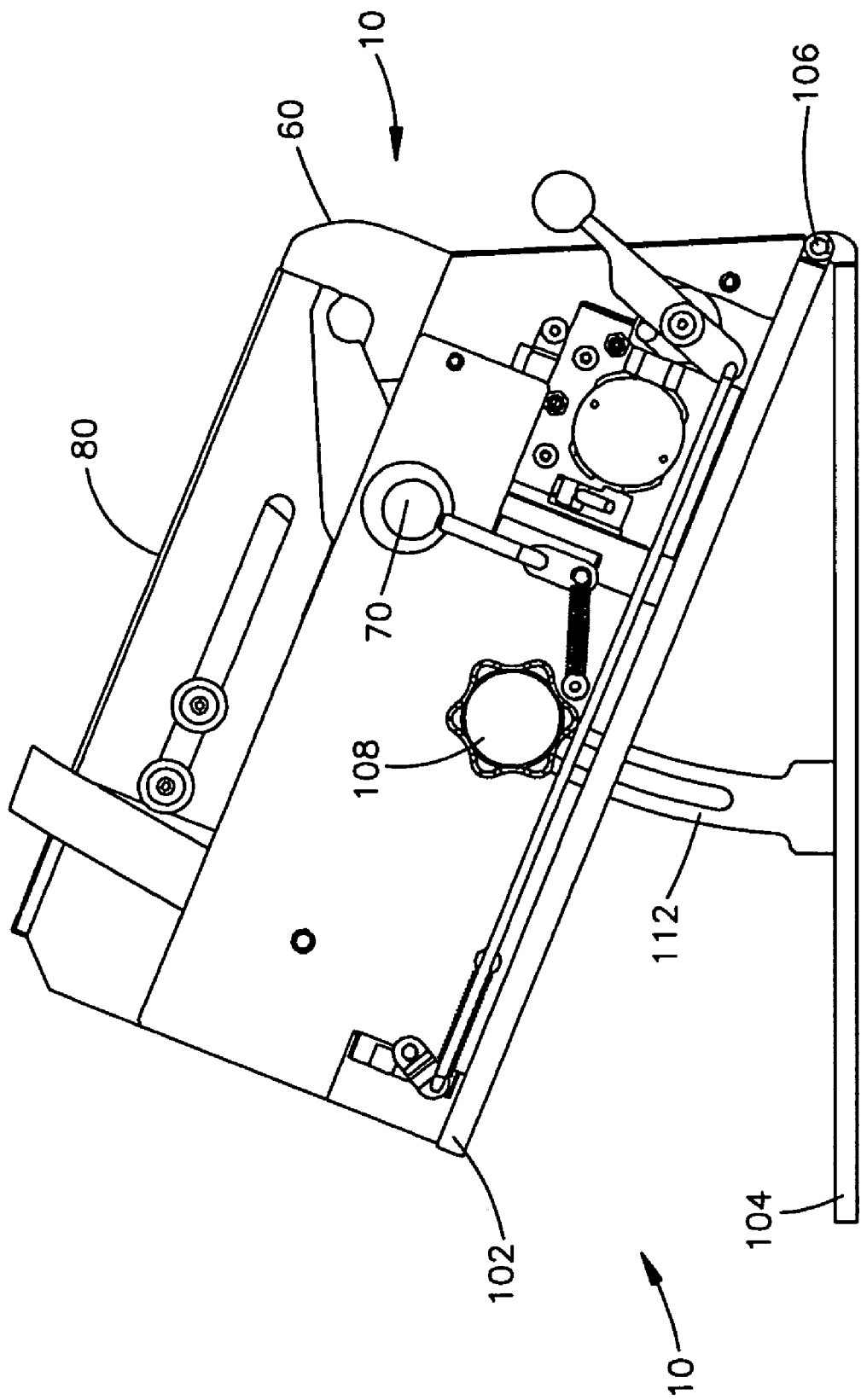
FIG. 6 is a side elevational view of the fixture shown in a tilted position.
Figure 7:
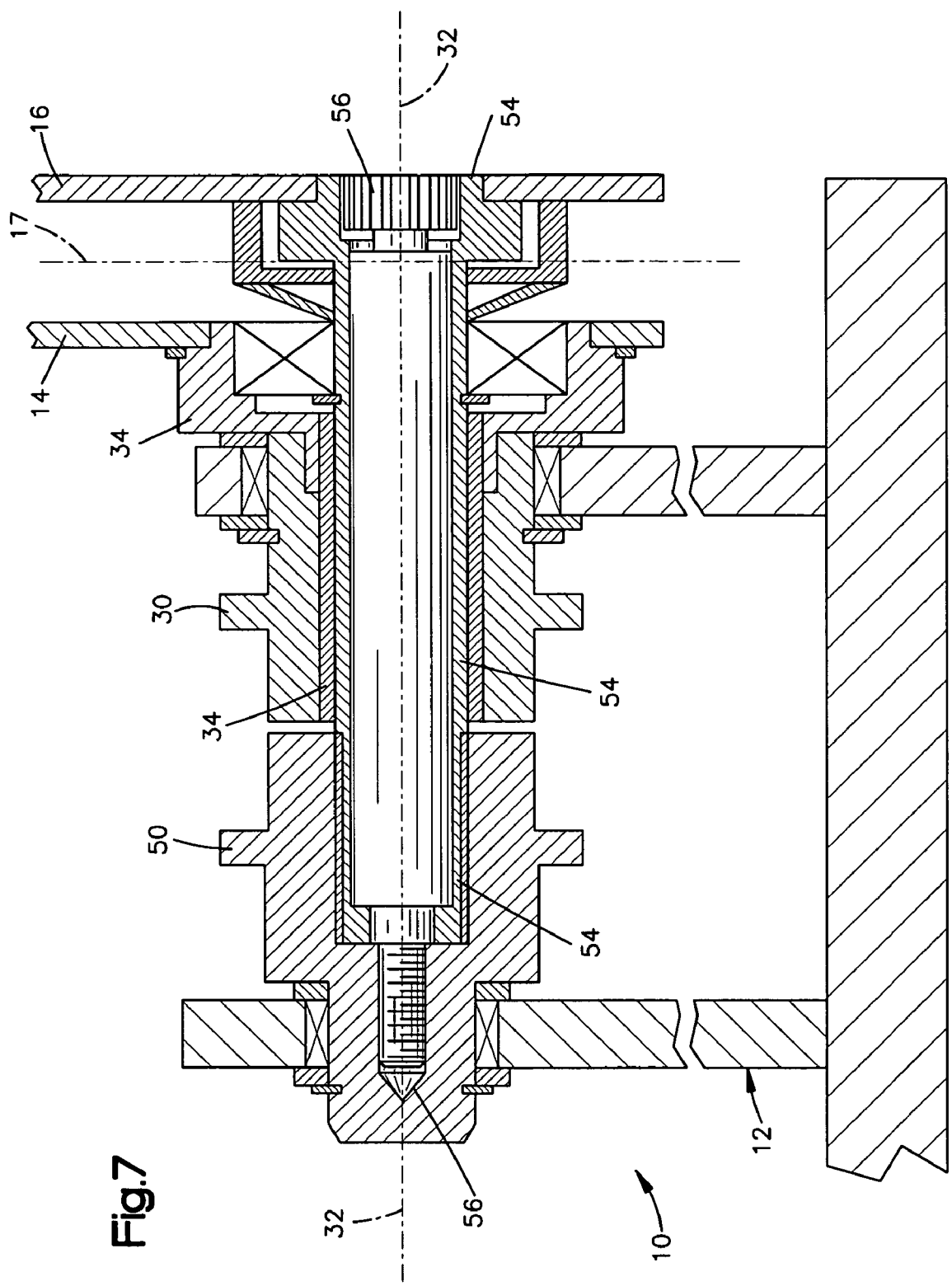
FIG. 7 is a sectional view through a portion of the fixture showing the splined connections of the hubs and barrels that transmit rotational force from the handles to the clamps.
Figure 8:
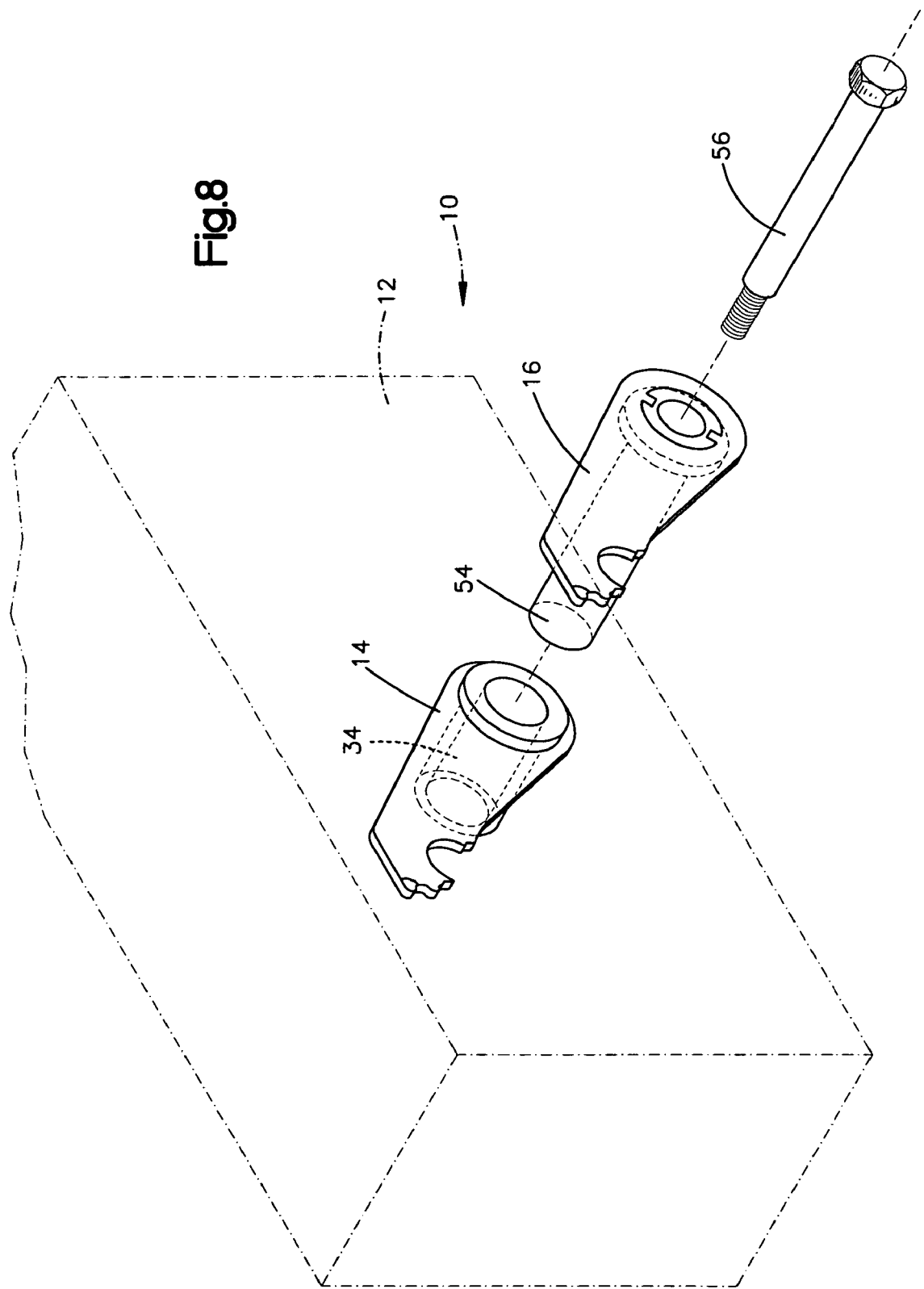
FIG. 8 is an exploded perspective view showing the left clamp and left barrel, the right clamp and right barrel, and the screw.

A right handle 20 has a manually graspable end portion in the form of a knob 22. The lower end of the handle 20 is formed as a base plate 24. Connected with the base plate 24 is an extension spring 26 (see FIG. 5). The opposite end of the extension spring 26, is connected with a right hub 30. The right hub 30 is supported for rotation about an axis 32. The right hub 30 has external splines that mate with internal splines on a left barrel 34. The left barrel 34 is thus rotatable with the right hub 30. The left clamp 14 is fixed for movement with the left barrel 34. Thus, upon movement of the right handle 20, the right hub 30 and the left barrel 34 are rotatable with each other about the axis 32, to pivot the left clamp 14.

A left handle 40 has a manually graspable end portion in the form of a knob 42. The lower end of the left handle 40 is formed as a base plate 44. Connected with the base plate 44 is an extension spring 46 (see FIGS. 1-3 and 5). The opposite end of the extension spring 46 is connected with a left hub 50. The left hub 50 is supported for rotation about the axis 32. The left hub 50 has external splines that mate with internal splines on a right barrel 54. The right barrel 54 is thus rotatable with the left hub 50. The right clamp 16 is fixed for movement with the right barrel 54. Thus, upon movement of the left handle 40, the left hub 50 and the right barrel 54 are rotatable with each other about the axis 32, to pivot the right clamp 16.

The splined connection between the left hub 50 and the right barrel 54 is spaced axially from the splined connection between the right hub 30 and the left barrel 34. The two barrels 34 and 54 are rotatable independently of each other about the axis 32. A screw 56 extends through the left barrel 34 and the right barrel 54 and is screwed into the right hub 30.

Each one of the clamps 14 and 16 has three basic positions relative to the weld head 60. Movement and positioning of the left clamp 14 is similar to movement and positioning of the right clamp 16, and so only the movement and positioning of the left clamp is described herein.

Figure 2:
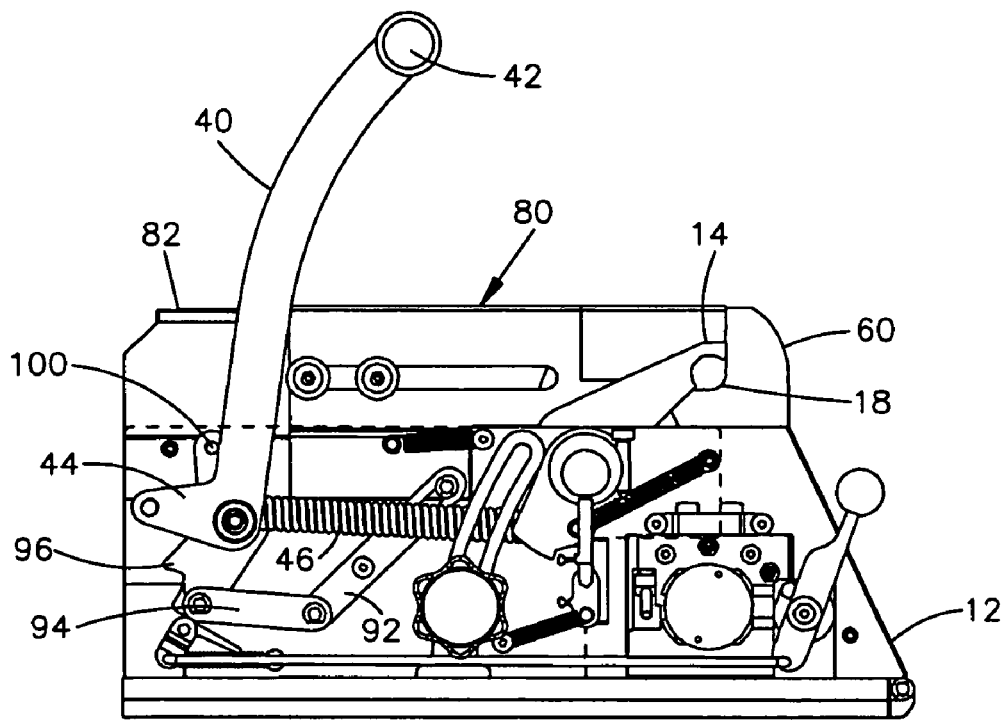
FIG. 2 is a side elevational view of the fixture, showing the handles and the clamps in the closed position.

A first position, i.e., a closed position, is shown in FIG. 2. In this position, the left clamp 14 is holding the workpiece against the fixed jaw 18. The spring force of the spring 26 acts through the right hub 30 and the left barrel 34 to hold the left clamp 14 against the workpiece. The right handle 20 engages a stop bar (not shown) to provide a positive stop that limits pivoting movement of the right handle 20 in the closing direction. The base plate 24 on the right handle 20 is in a first over center position relative to the pivot axis of the right handle. The force of the spring 26 holds the left clamp tightly closed.

A second position, i.e., an open or load position, is shown in FIG. 1. In this position, the left clamp 14 is moved away from the closed position, to enable a workpiece to be removed from, or put into position against, the fixed jaw 18.

To move the left clamp 14 from the closed position to this open position, the right handle 20 is grasped manually and caused to pivot about its axis. The right handle 20 acts through the spring 26 to rotate the right hub 30 about the axis 32. Rotation of the right hub 30 acts through the splined connection to transmit rotational force to the left barrel 34 and thence to the left clamp 14 itself. The left clamp 14 pivots about the axis 32 to the open position.

During this movement of the left clamp 14 from the closed position to the open position, the base plate 24 on the right handle 20 moves over center relative to its axis so that the spring 26 also holds the pieces in this position.

Figure 3:
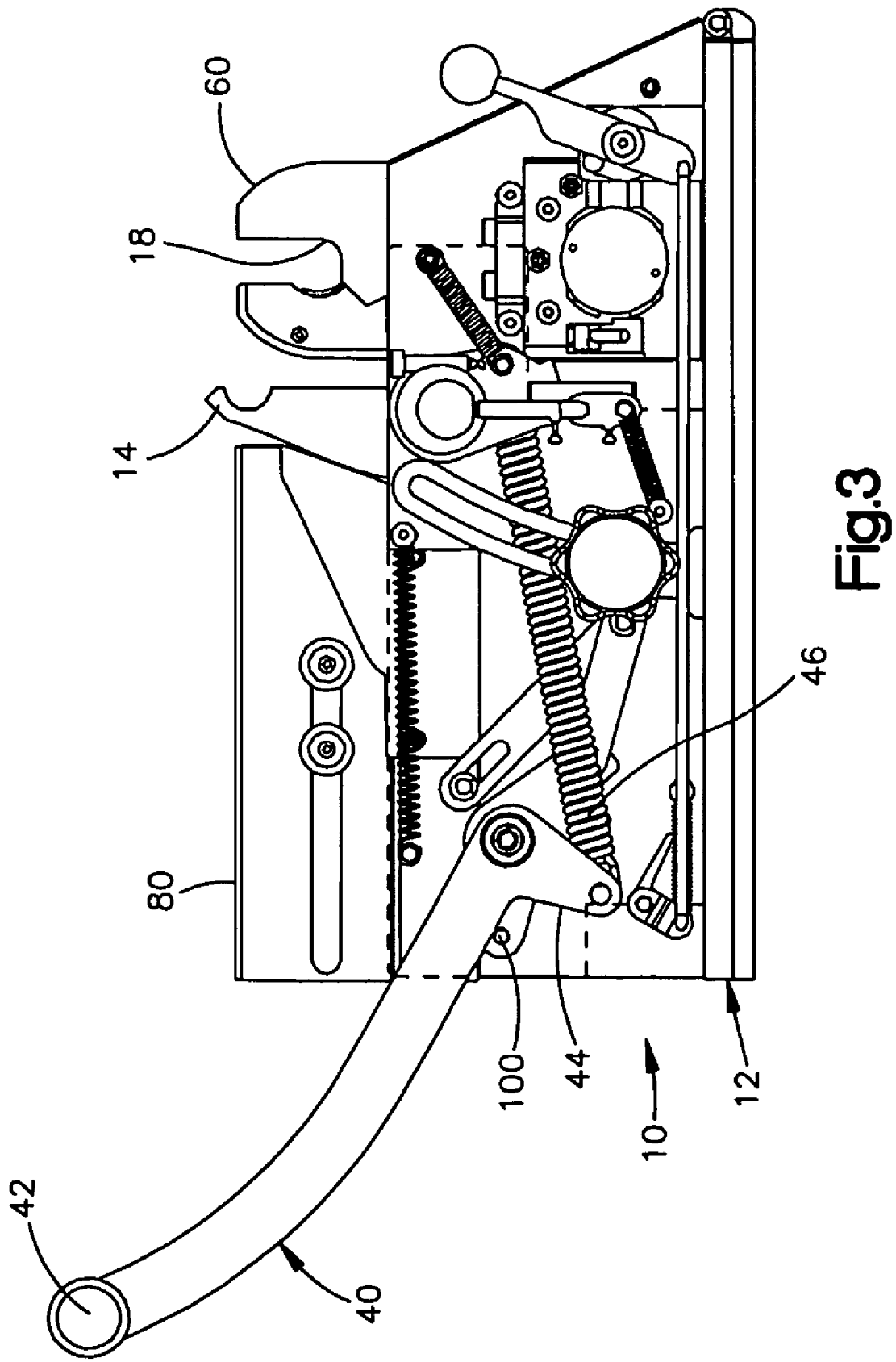
FIG. 3 is a side elevational view of the fixture, showing the handles and the clamps in the tool change position.

A third position, i.e., a tool change position, is shown in FIG. 3. In this position, the left clamp 14 is located even farther away from the closed position, to enable the left clamp to be removed from the fixture 10 in order to, for example, put on a clamp of a different size.

In order for the left clamp 14 to be moved into the tool change position, a tool change lever 70 is first moved from the position shown in FIGS. 1 and 2 to a tool change position (not shown). This movement of the tool change lever 70 moves a cam or hard stop 72 (FIG. 25) away from a projection on the right hub 30. This movement of the stop 72 allows the right hub 30 to rotate past the open position to the tool change position, under the influence of force applied to the right handle 20.

Thus, to move the left clamp 14 from the open position to the tool change position, the tool change lever 70 is first pulled forward, allowing the handles to be moved farther back. The right handle 20 is grasped manually and caused to pivot farther about its axis. The right handle 20 acts through the spring 26 to rotate the right hub 30 even farther about the axis 32. This additional rotation of the right hub 30 transmits rotational force to the left barrel 34 and thence to the left clamp 14 itself. The left clamp 14 pivots about the axis 32 to the tool change position.

During movement of the left clamp 14 from the open position to the tool change position, the base plate 24 on the right handle 20 moves even farther over center with respect to its pivot axis. The handle 20 stops at the shortest spring distance of overcenter action, so that the spring 26 holds the pieces in this position.

It can be seen that right handle 20 moves the left clamp 14, and the left handle 40 moves the right clamp 16. This arrangement of parts enables the operator to use the operator's right hand to grasp the workpiece that is being held by the right clamp 16, while grasping its operating handle, the left handle 40, with the operator's left hand. Similarly, the operator uses the operator's left hand to grasp the workpiece that is being held by the left clamp 14, while grasping its operating handle, the right handle 20, with the operator's right hand. As a result, the operator need not reach across the fixture 10 to put both hands on the same side of the weld head 60 or fixture 10, when dealing with workpieces, moving them either onto or off of the fixture.

When the fixture 10 is in the tool change position, the left and right clamps 14 and 16 are spaced apart from the closed position (and from the fixed jaw 18) by a distance that is significantly more than when the clamps are in the open position. This extended positioning of the left and right clamps 14 and 16 enables them to be clear of the weld head 60. The left and right clamps 14 and 16 can then be changed out simply by removing the single screw 56 and sliding the clamps (along with their attached barrels 34 and 54) axially or laterally out of the fixture 16, to the right as viewed in FIG. 4. Thus, to change the clamps 14 and 16, the weld head 60 does not have to be removed, nor any other parts of the fixture 10 at all, other than the one screw 56.

The operator normally needs to move the right handle 20 only between the open and closed positions, which is not a large distance. The tool change position is substantially farther away from the closed position. In addition, it should be noted that the handles can be operated, or the clamp plates otherwise actuated, via something other than manual force—e.g., pneumatic or electric.

The knobs 22 and 42 on the handles 20 and 40 are spaced apart from the two clamps 14 and 16 by a large distance, even when the clamps are in the open position. In one fixture 10 constructed in accordance with the invention for welding workpieces having a diameter in the range of from about one quarter inch to about one half inch, the knobs 22 and 42 are six inches to a foot away from the clamps 14 and 16. To move the clamps 14 and 16, the operator does not need to touch the clamps or the weld head 60 or any of the metal pieces near the clamps or the welding area, only the handles 20 and 40. Thus, the actual clamping portions of the fixture itself, i.e., the movable clamps 14 and 16, the fixed jaw 18, or any other nearby piece, does not need to be touched by the operator. This is advantageous especially if the fixture 10 is hot from welding. Because the actuation force for the fixture operation is applied at a location remote from the clamps 14 and 16, the operator's hands are disassociated from the location at which the fixture 10 grasps the workpieces.

The fixture clamping mechanism includes an arc cover 80 for shielding the user from the light energy of the welding process. The arc cover 80 is supported for sliding movement on a longitudinal rail 82 of the base 12, in-line with the weld head 60, with its motion being restricted in all other directions. Therefore, the arc cover 80 can slide toward and away from the weld head 60, along the longitudinal rail 82, but cannot move to either side of the weld head. The arc cover 80 does not move laterally off the rail 82, thus keeping the areas to the sides of the rail, where the workpieces would be located, unobstructed.

An upper arc cover pin 84 and a lower arc cover pin 86 extend from the inner sidewall of the arc cover 80. One end of an arc cover return spring 88 is connected to the upper arc cover pin 84. The other end of the arc cover return spring 88 is connected to the base 12. As the arc cover 80 slides away from the weld head 60, the spring 88 stretches. The spring tension that is created helps to return the arc cover 80 to the closed position over the weld head 60 when other forces on the arc cover, tending to move the arc cover away from the closed position, are released.

The lower arc cover pin 86 is connected to a rotatable plate 96 via a slotted link 92 and a connector link 94. The slotted link 92 receives the lower arc cover pin 86 so as to allow the pin to slide within the slot. The distal end of the slotted link 92 is pivotally connected to the connector link 94. At an intermediate position along the length of the slotted link 92, the slotted link is pivotally mounted on the base 12 so as to allow the slotted link to rotate about its intermediate point relative to the base.

The opposite end of the connector link 94 is pivotally connected to the rotatable plate 96. An intermediate portion of the rotatable plate 96 is pivotally mounted on the base 12. One end of the rotatable plate 96 has a handle follower pin 100 that extends perpendicularly from the plate and is in the path of movement of the handles 20 and 40. The handle follower pin 100 is located behind both of the handles 20 and 40. Because of the force of the return spring 88, the pin 100 remains in contact with whichever handle 20 or 40 is in the rear most position (or both if both are in that position).

The combination of the arc cover 80 being connected to the arc cover spring 88 as described, and connected to the rotatable plate 96 and follower pin 100 as described, has several advantages. First, as mentioned, the follower pin 100 remains in contact with whichever one of the handles 20 or 40 is in the rear most position. Therefore, when the arc cover 80 is in the closed position as shown in FIG. 2, the arc cover will slide away from the welding head 60, into the load position, when either handle 20 or 40 is pushed away (back). This makes the welding area visible to the operator during positioning of either clamp 14 or 16 with its associated handle 20 or 40.

Conversely, when the arc cover 80 is in the load position as shown in FIG. 1, the arc cover will slide back to the closed position only when both handles 20 and 40 have been pulled forward, keeping the welding area visible to the operator.

Second, the arc cover 80 can be manually slid away from the weld head 60, against the bias of the return spring 88, without moving either one of the handles 20 or 40. This manual operation allows the user quickly to check work piece alignment, without moving the handles 20 and 40.

In accordance with another feature of the invention, the fixture 10 has two separate base plates, a top base plate 102 and a bottom base plate 104. The top base plate 102 is connected to the bottom base plate 104 via a hinge 106 positioned at the front of the two base plates. The other parts of the fixture 10 clamping mechanism are mounted on the top base plate 102. The hinged connection allows the top base plate 102 to be pivoted upward and forward from the bottom base plate 104 about the axis of the hinge 106. An adjustment knob 108 is mounted onto the fixture clamping mechanism 10 for travel along a slotted guide 112 when the top base plate 102 and fixture clamping mechanism 10 pivot relative to the bottom base plate 104. The adjustment knob 108 is positioned so as to be tightenable against the slotted guide 112 to secure the fixture clamping mechanism 10 in a desired position of tilt. Rotating the adjustment knob 108 in the opposite direction releases the fixture clamping mechanism 10, allowing it to be repositioned by the user. In this way, the user may adjust the line of sight required to view the weld joint during the welding operation.

FIGS. 9-20 illustrate a fixture 200 that is a second embodiment of the invention. The fixture 200 is usable in a manner similar to the manner of use of the fixture 10, to weld together two pieces that are releasably clamped adjacent a weld head. Many parts of the fixture 200 are similar in construction and operation to parts of the fixture 10, and such parts are described only briefly here.

The fixture 200 includes a base 202. The base 202 includes side plates 206 (FIG. 9) and a bottom plate 208 preferably formed as one piece, such as by milling from an L-shaped aluminum extrusion.

A clamp drive assembly 210 of the fixture 200 includes a shaft 212 (FIG. 15) supported on the two side plates 204 and 206 for rotation about an axis 214. A first handle, or outer handle, 216 is connected with the shaft 212 through a linkage mechanism 218 that is similar in construction and operation to the linkage mechanism shown in the first embodiment of the invention. As a result, when the outer handle 216 is pivoted, the shaft 212 rotates about the axis 214.

The shaft 212 extends for substantially the entire width of the clamp drive assembly 210 of the fixture 200. The shaft 212 is not splined but instead has a smooth, cylindrical outer surface. An outer end portion 220 (FIG. 20) of the shaft 212 includes two radially outward opening notches 222 formed in the outer end face of the shaft.

The clamp drive assembly 210 of the fixture 200 also includes a sleeve 230 that is supported on the shaft 212 for rotation about the shaft and thus about the axis 214. The sleeve 230 is larger in diameter than the shaft 212. A second handle, or inner handle, 232 is connected with the sleeve 230 through a linkage mechanism 234 that is similar in construction and operation to the linkage mechanism shown in the first embodiment of the invention. As a result, when the inner handle 232 is pivoted, the sleeve 230 rotates about the axis 214.

The sleeve 230 for its entire length extends about the shaft 212, so that the outer end portion 220 of the shaft 212 projects axially outward of the sleeve. The sleeve 230 is not splined but instead has a smooth, cylindrical inner surface. Two radially outward opening notches 236 (FIG. 20) are formed in the outer end of the sleeve 230. The notches 236 in the sleeve 230 are farther apart than the notches 222 in the shaft 212.

The clamp drive assembly 210 of the fixture 200 also includes a hub 240. The hub 240 is an axially short, annular member that is designed to fit on the end of the shaft 212 and replicate the end of the sleeve 230. The hub 240 has two radially inwardly extending tabs 242 that fit into the outwardly opening notches 222 on the outer end portion 220 of the shaft 212. When this is done, the hub 240 becomes rotatable with the shaft 212. The hub 240 also has two radially outward opening notches 244 that are identical in configuration and radial location to the notches 236 on the sleeve 230. The hub 240 in this aspect thus replicates, on the outer end portion of the shaft 212, the outer end portion of the sleeve 230.

The fixture 200 includes a first clamp plate, or inner clamp plate, 250 and a second clamp plate, or outer clamp plate, 252. In the fixture 200, the two clamp plates 250 and 252 are physically the same as each other, to reduce manufacturing cost and complexity.

The two clamp plates 250 and 252 are disposed on opposite sides of a welding plane 253 (FIG. 15), which is the plane in which a welding electrode of the weld head 60 rotates to effect welding of the two workpieces.

On a first side, or outer side, of the fixture, that is, to the left (as viewed in FIG. 15) of the welding plane 253, there is located the second clamp plate 252. On a second side, or inner side, of the fixture, that is, to the right (as viewed in FIG. 15) of the welding plane 253, there is located the first clamp plate 252. The first and second handles 216 and 232 are both located on the second side of the fixture.

Each one of the clamp plates 250 and 252 has an annular hub portion 254 with two radially inward extending tabs 256. The tabs 256 are sized and located to fit into the radially outward opening notches on the hub or into the radially outward opening notches 236 on the sleeve 230. Thus, either one of the two clamp plates 250 or 252 can be fitted on the sleeve 230 or on the hub 240.

The clamp drive assembly 210 of the fixture 200 is assembled by, first, placing the inner clamp plate 250 over the projecting outer end portion 220 of the shaft 212 and into engagement with the sleeve 230. The tabs 256 of the inner clamp plate 250 fit into the notches 236 on the sleeve 230. As a result, the inner clamp plate 250 is pivotable upon rotation of the sleeve 230.

A thrust roller bearing shown schematically at 258 is then placed over the shaft 212. The hub 240 is then placed over the outer end portion 220 of the shaft 212. The tabs 242 of the hub 240 fit into the notches 222 on the outer end portion 220 of the shaft 212. As a result, the hub 240 is rotatable with the shaft 212.

The outer clamp plate 252 is placed onto the hub 240. The tabs 256 of the outer clamp plate 252 fit into the notches 244 on the hub 240. As a result, the outer clamp plate 252 is pivotable upon rotation of the hub 240 and the shaft 212.

The fixture 20 includes a side plate or fixed jaw 260 (FIG. 9) that is removably mounted to the base 202. The fixed jaw 260 is mounted to the base 202 after the weld head 262 is affixed. The weld head 262 is secured with two socket head screws extending through a horizontal rail portion of the base 202 and into the weld head. The fixed jaw 260 is then slipped down over the weld head 262, being aligned with a pin on the base 202 that fits into a hole on the underside of the fixed jaw. The fixed jaw 262 has a horizontal surface (not shown) that rests on a horizontal surface of the weld head 262 to set the vertical position of the fixed jaw relative to the weld head. A spring clamp 272 then is engaged with a projecting button 274 on the fixed jaw 260, to retain the fixed jaw in position on the weld head 262. The fixed jaw 260 supports the workpieces being welded, in position on the weld head 262, with the workpieces being releasably held down on the fixed jaw by the movable clamp plates 250 and 252. (The fixed jaw may be held on the base 202 by other means than the spring clamp 272, for example, one or more screws.)

Figure 16:
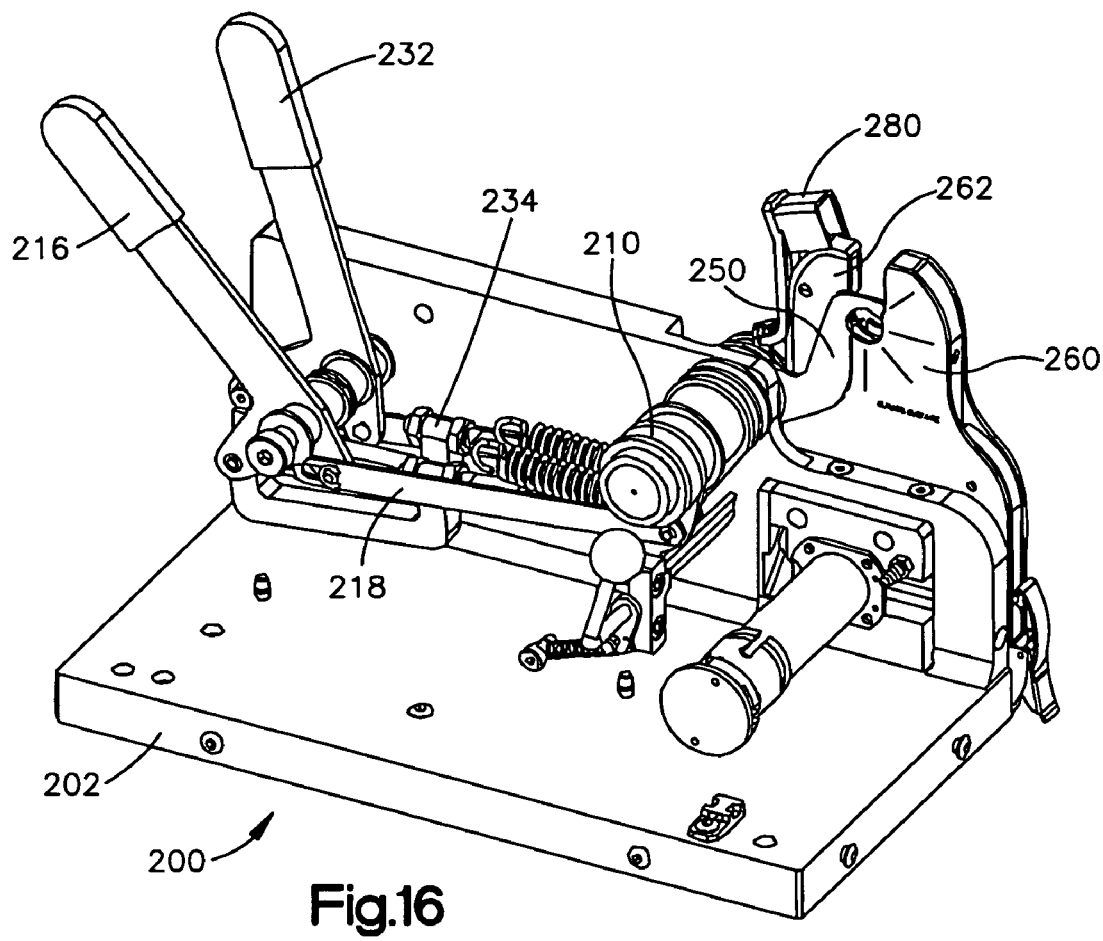
FIGS. 16-19 are additional views of the fixture of FIG. 9.
Figure 17:
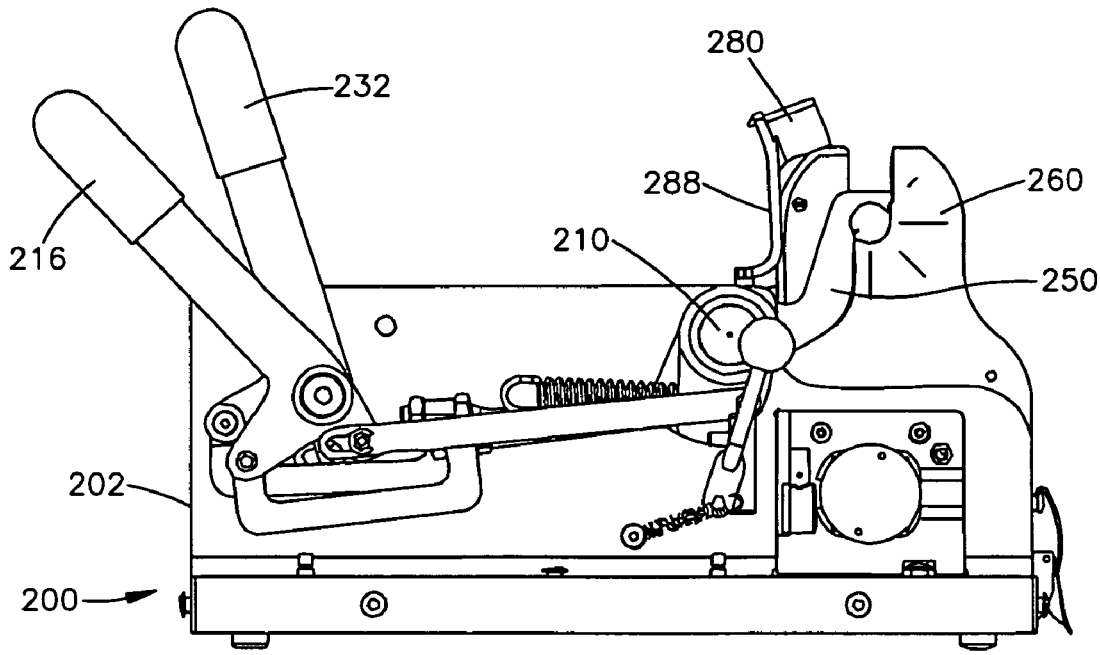
Figure 18:
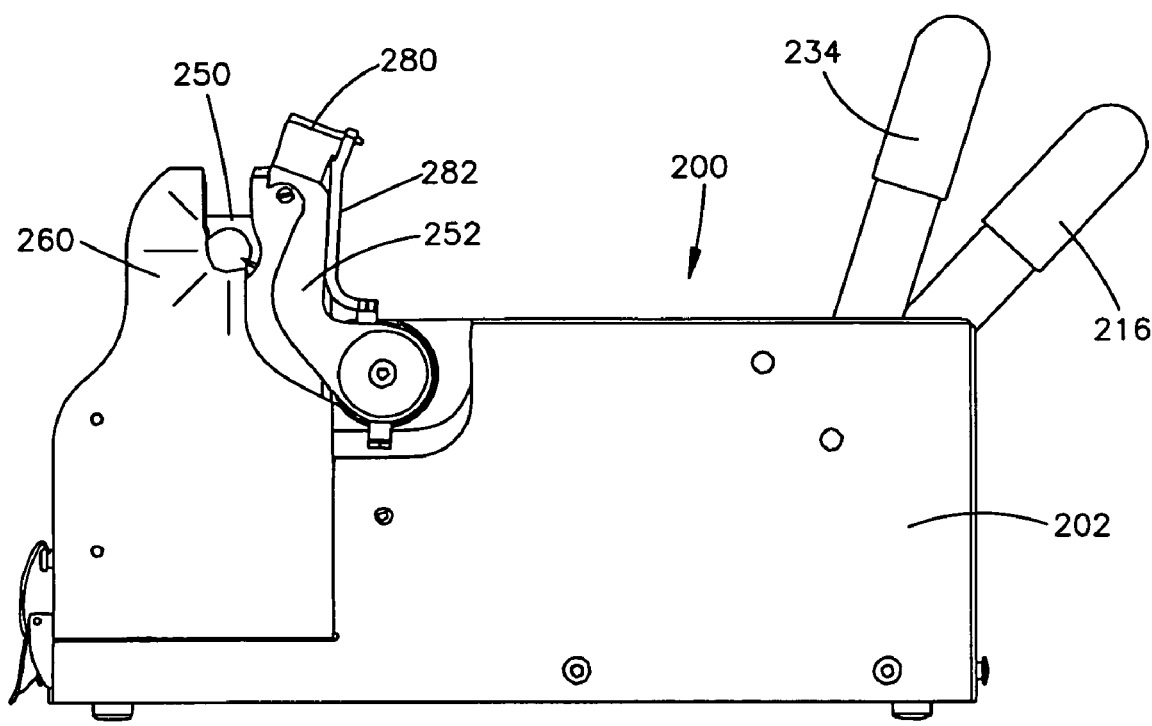
Figure 19:
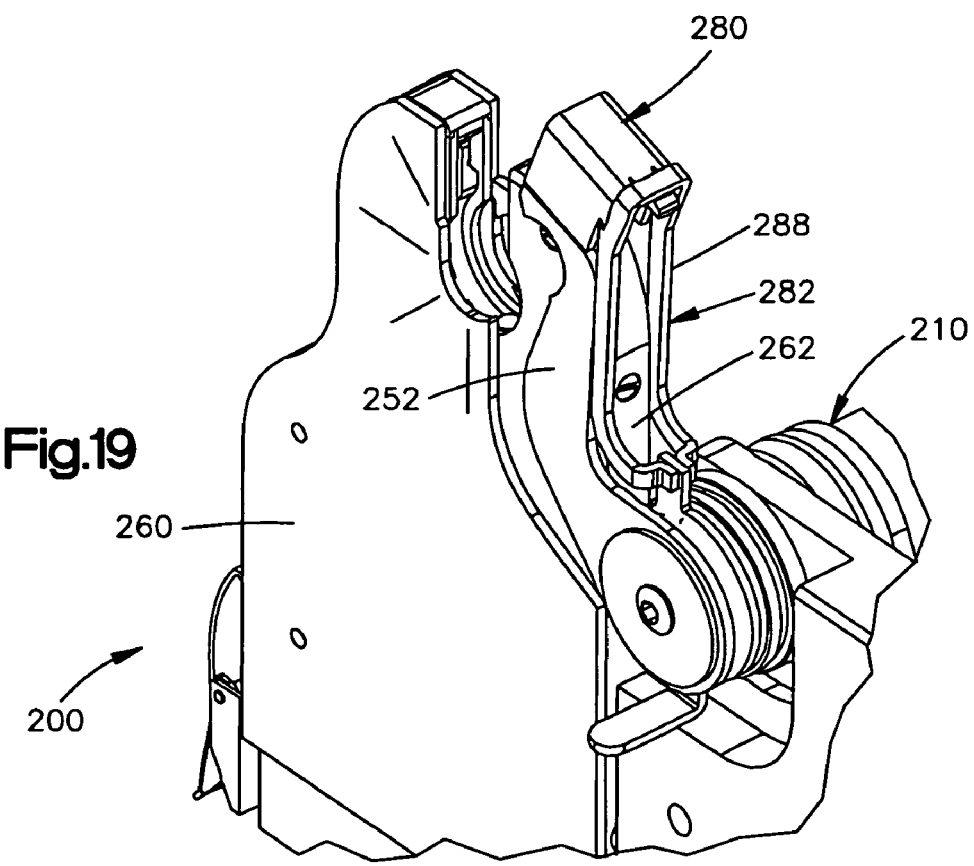
Figure 20:
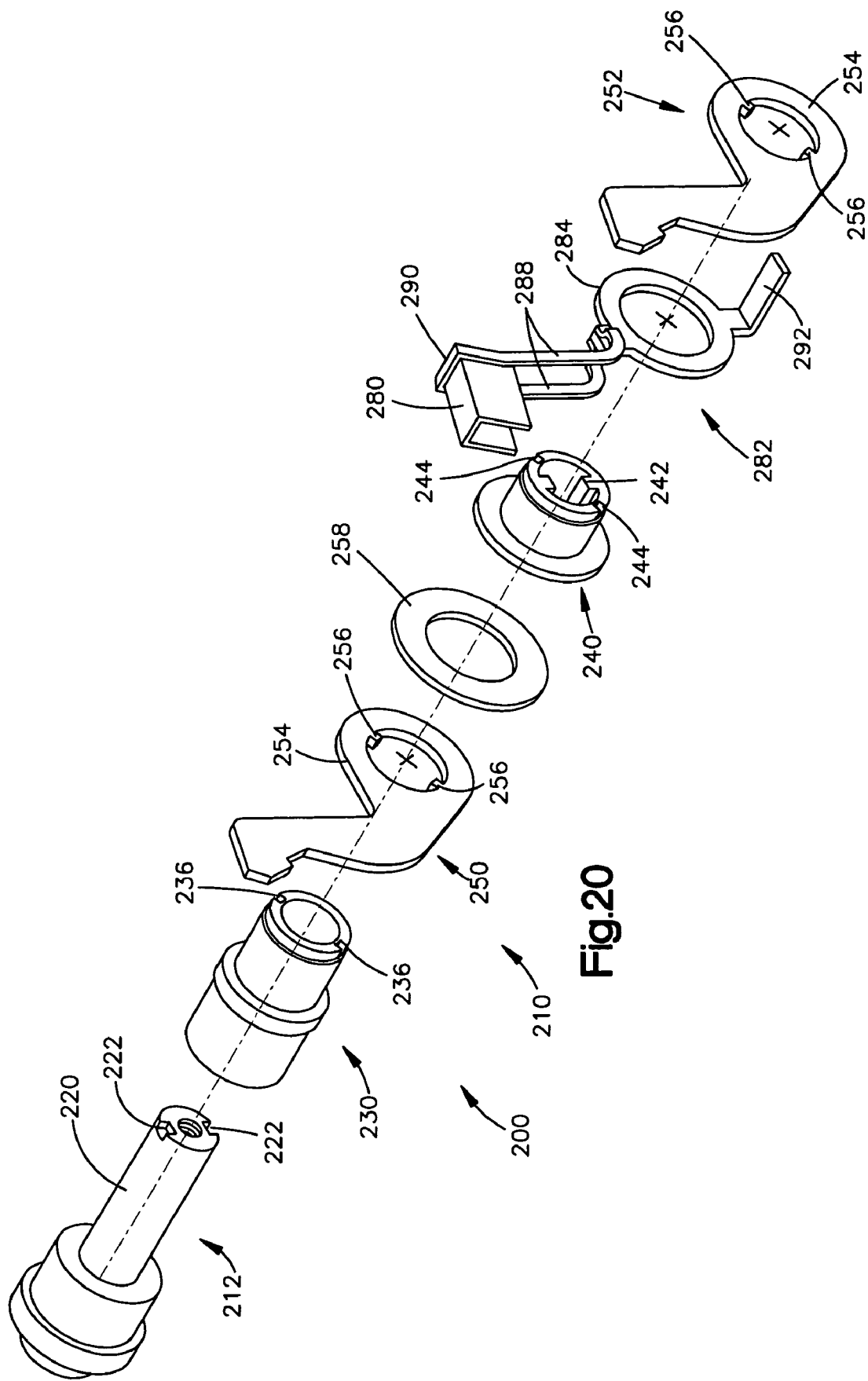
FIG. 20 is an exploded perspective view of parts of the clamp drive assembly of the fixture of FIG. 9.
Figure 21:
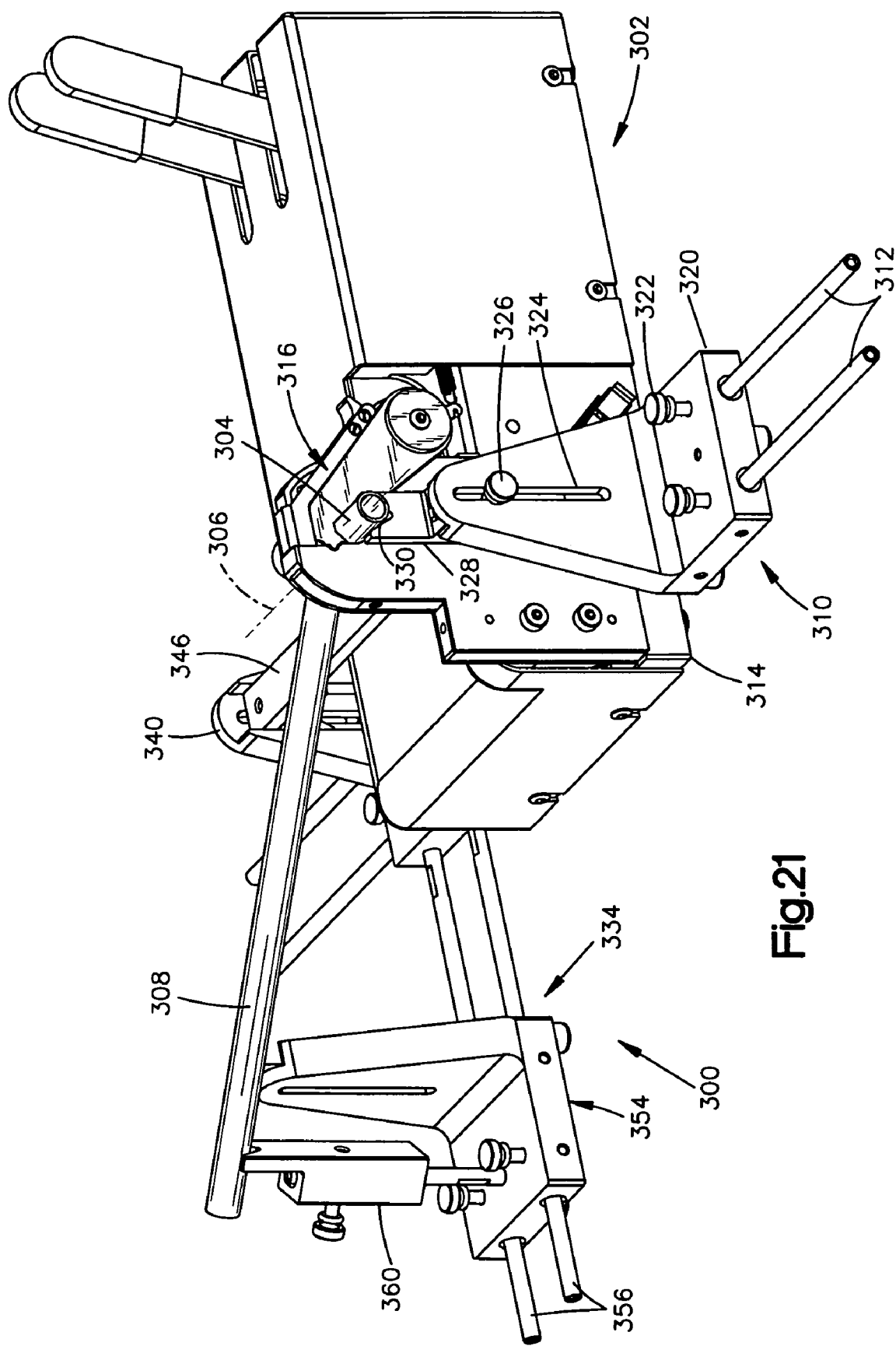
FIG. 21 is a perspective view of a workpiece support system usable with a welding fixture.
Figure 22:
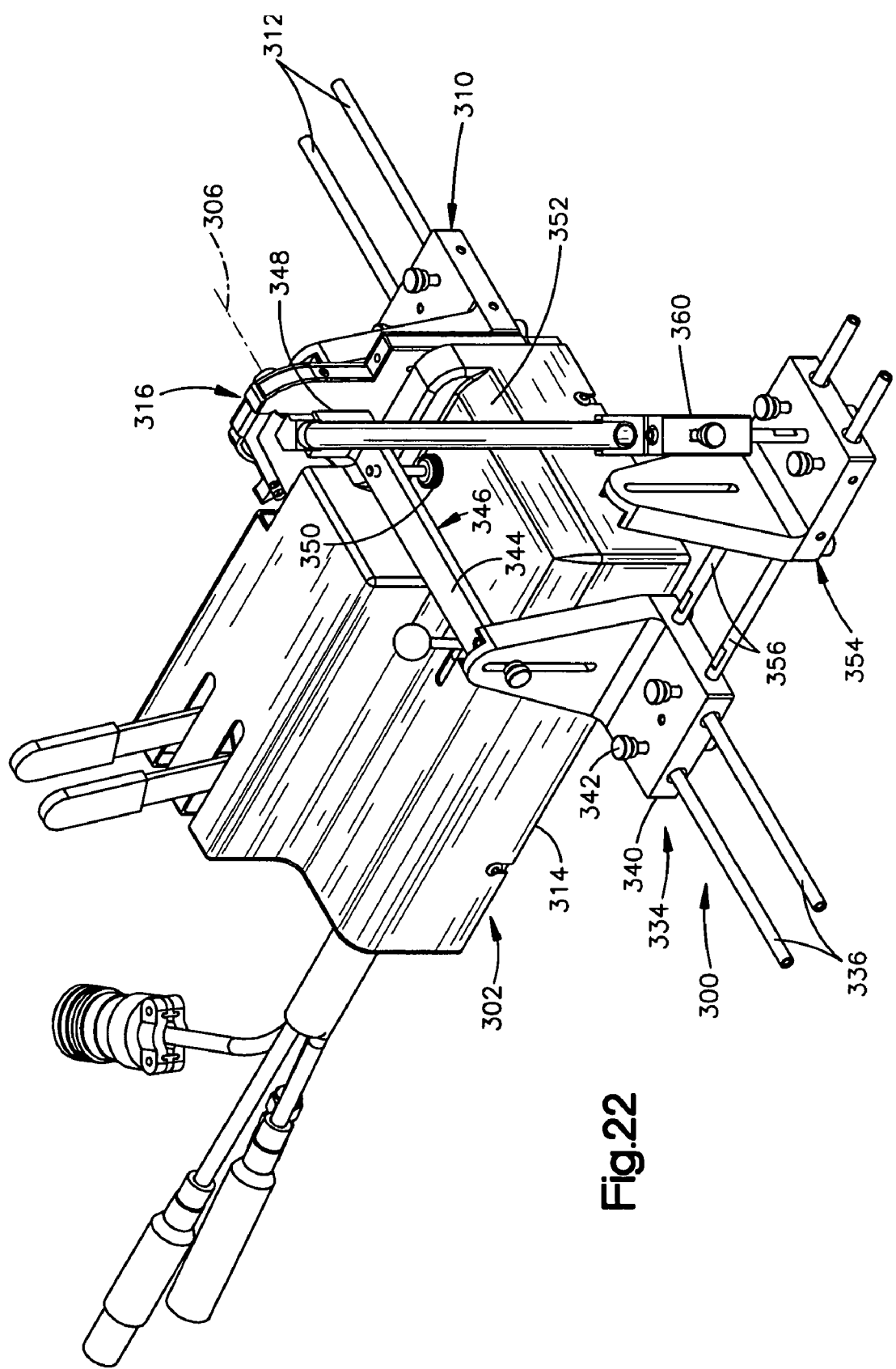
FIG. 22 is another perspective view of a workpiece support system of FIG. 22.

To move the first or outer clamp plate 252, the first or outer handle 216 is pivoted between its open position as shown in FIGS. 16 and 17 and its closed position as shown in FIGS. 9-12. Pivoting movement of the outer handle 216, which takes place on the second side of the fixture 200, causes the shaft 212 to rotate about the axis 214. Rotation of the shaft 212, which extends across the welding plane 253, causes the hub 240 to rotate, thereby pivoting the outer clamp plate 252 on the first side of the welding fixture. The outer clamp plate 252 is thereby movable relative to the fixed jaw 260 between an open position and a closed position. (It should be noted that the handles can be operated, or the clamp plates otherwise actuated, via something other than manual force—e.g., pneumatic or electric.)

The second or inner clamp plate 250 is pivotable independently of the outer clamp plate 252, because the two handles 216 and 232 and their respective linkages 218 and 234 are separately movable. To move the second or inner clamp plate 250, the second or inner handle 232 is pivoted, on the second side of the welding fixture 200, between an open position (not shown) and a closed position as shown in FIGS. 12-15. Pivoting movement of the inner handle 232 causes the sleeve 230 to rotate about the axis 214. Rotation of the sleeve 230, which occurs on the second side of the welding fixture, causes the inner clamp plate 250 to pivot (also on the second side of the welding fixture) between its open and closed positions relative to the fixed jaw 260.

When the clamp plates 250 and 252 rotate between their open and closed positions, they stay within the envelope of the weld head 262 (as seen or projected laterally, along the direction of the axis 214). This aspect of the fixture 200 is beneficial in that it minimizes the operating space needed for the fixture itself, thus making it possible to work with larger or differently shaped workpieces. This beneficial effect is a result of the configuration of the clamp plates 250 and 252 and of their relatively small pivoting arc of movement.

Another beneficial aspect of the fixture 200 as thus described is the relative simplicity of the clamp drive assembly 210, which can be easier and less costly to manufacture than the corresponding assembly of the fixture 10 with its splined fittings. In addition, the configuration of the clamp drive assembly 210 that allows for identical inner and outer clamp plates 250 and 252 helps to reduce cost and to simplify assembly. Specifically, the hub 240 allows the clamp plates 250 and 252 to be the same as each other—and to allow the plates not to be welded to the sleeve or shaft.

In the fixture 200, the inner and outer handles 216 and 232 are shorter and smaller than the handles of the fixture 10. In addition, the inner and outer handles 216 and 232 do not extend laterally outward of the plane of the outside face of the weld head 262, as can be seen from FIG. 12, for example (to the top as viewed in FIG. 12). This aspect of the fixture 200 again has the benefit of enabling welding of workpieces that extend away from the weld head 262 in a direction along the length of the fixture, that is, generally toward the handles 216 and 232, or to the left as viewed in FIG. 12. Further, as with the first embodiment, the right (outer) handle 216 moves the outer clamp plate 252, while the left (inner) handle 232 moves the inner clamp plate 250. This again enables the improved ease of operation discussed above with reference to the first embodiment of the invention.

Figure 9:
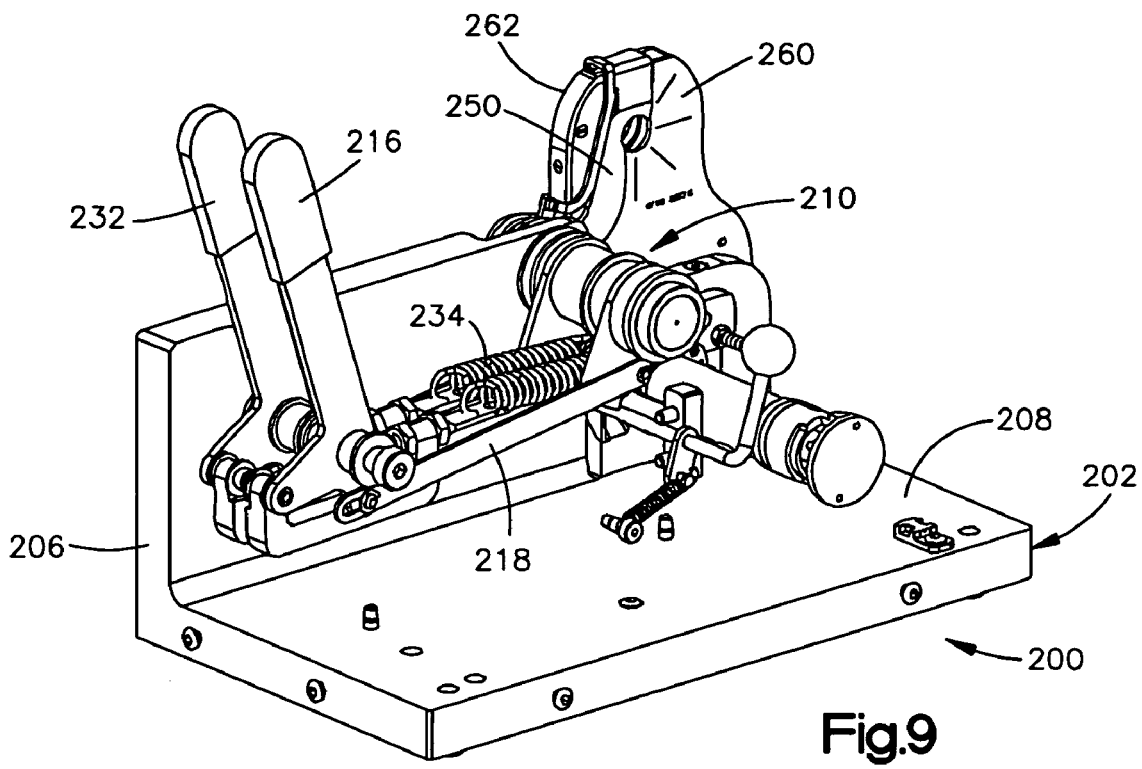
FIGS. 9-11 are perspective views of a fixture in accordance with a second embodiment of the invention.
Figure 10:
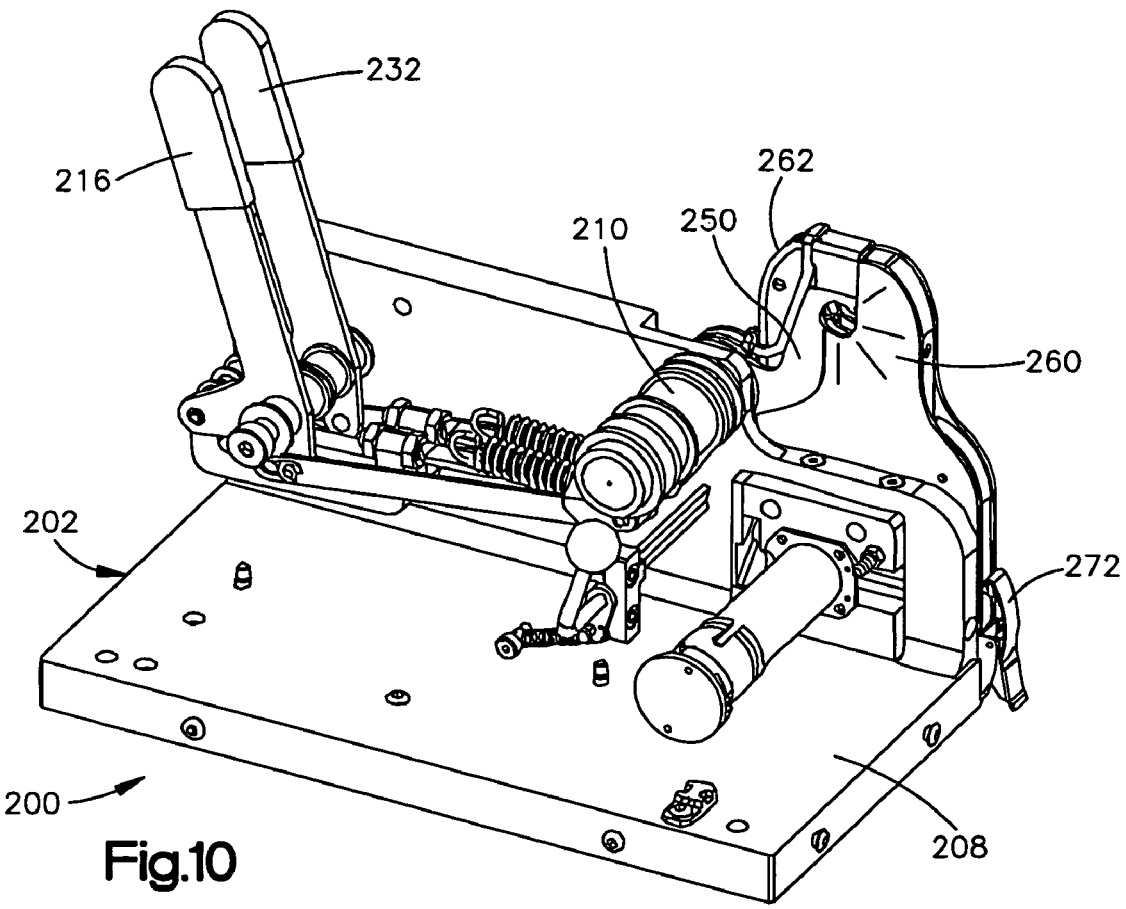
Figure 11:
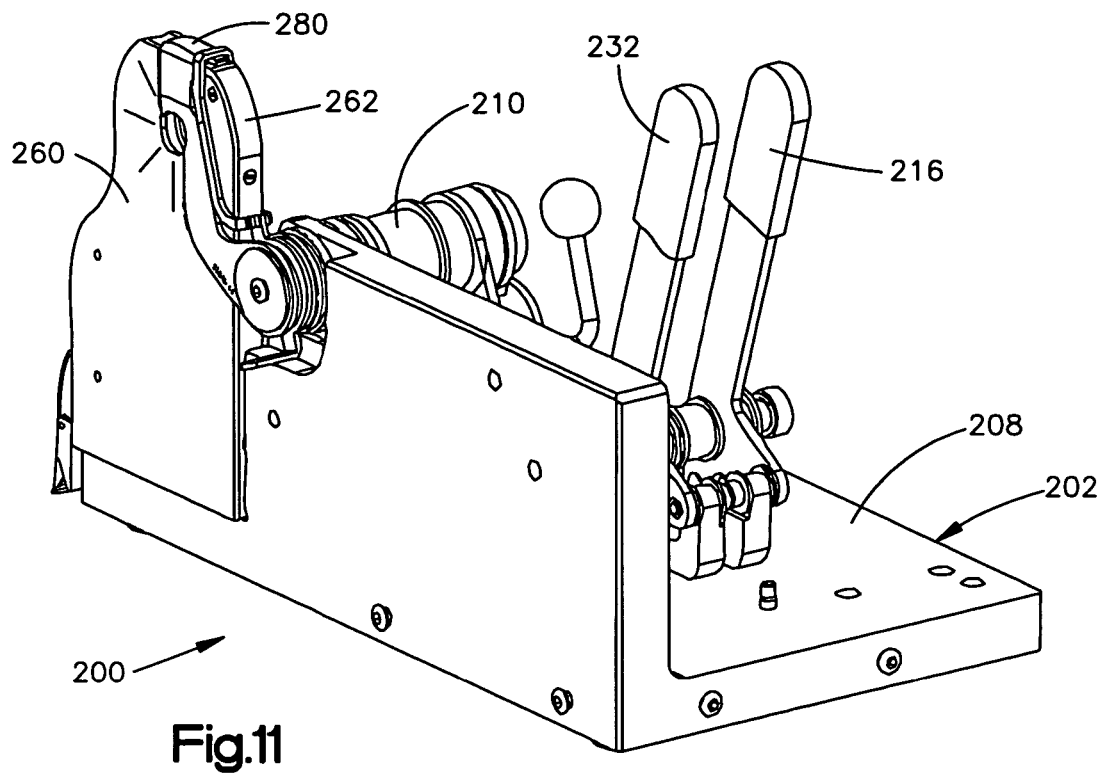
Figure 12:
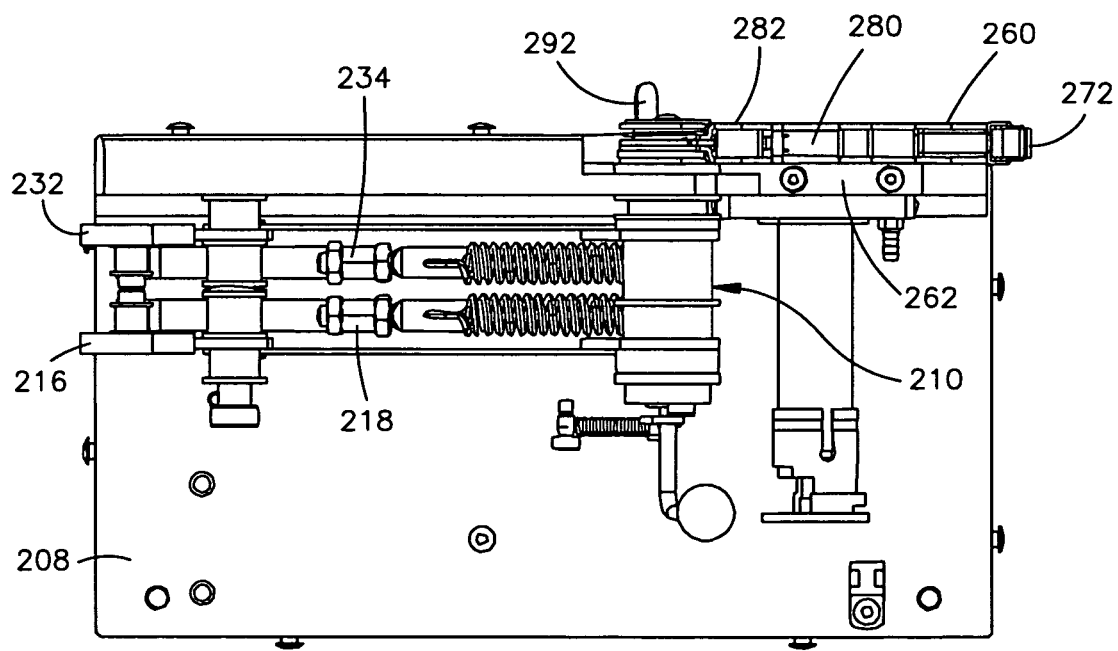
FIG. 12 is a top plan view of the fixture of FIG. 9.
Figure 13:
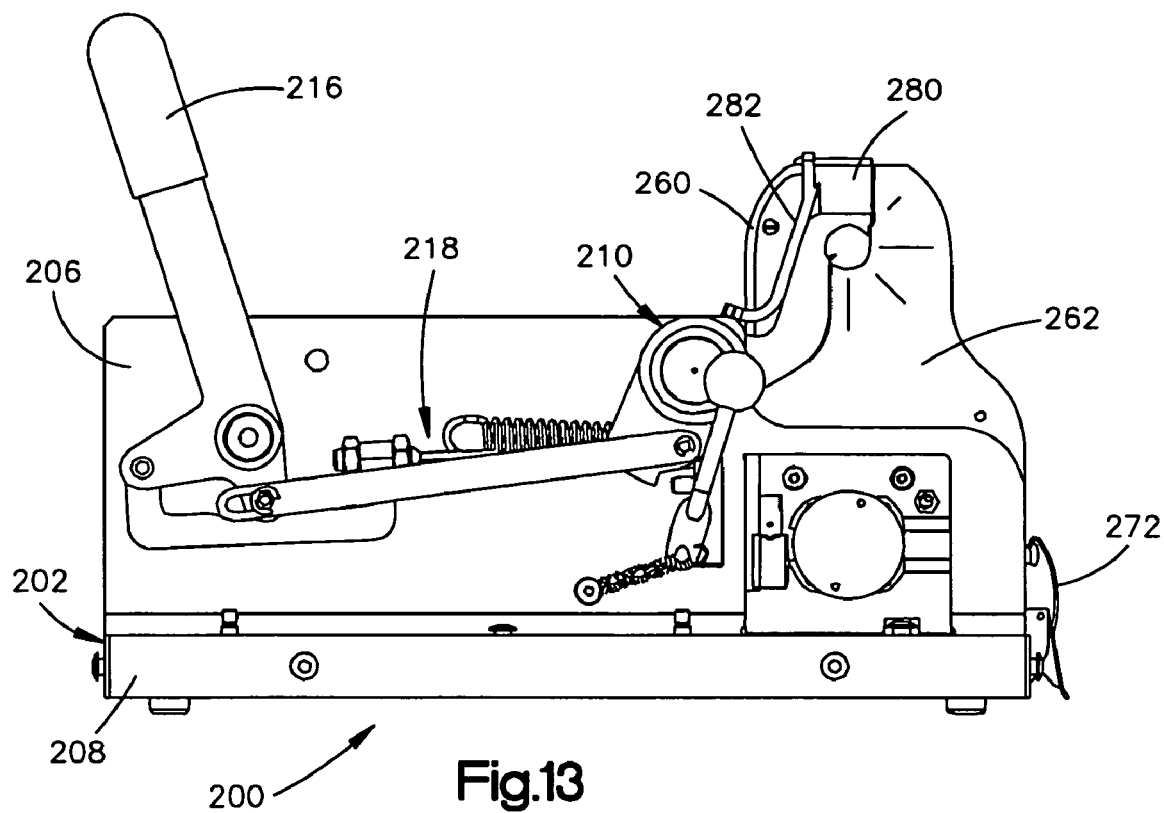
FIGS. 13 and 14 are elevational views of the fixture of FIG. 9.
Figure 14:
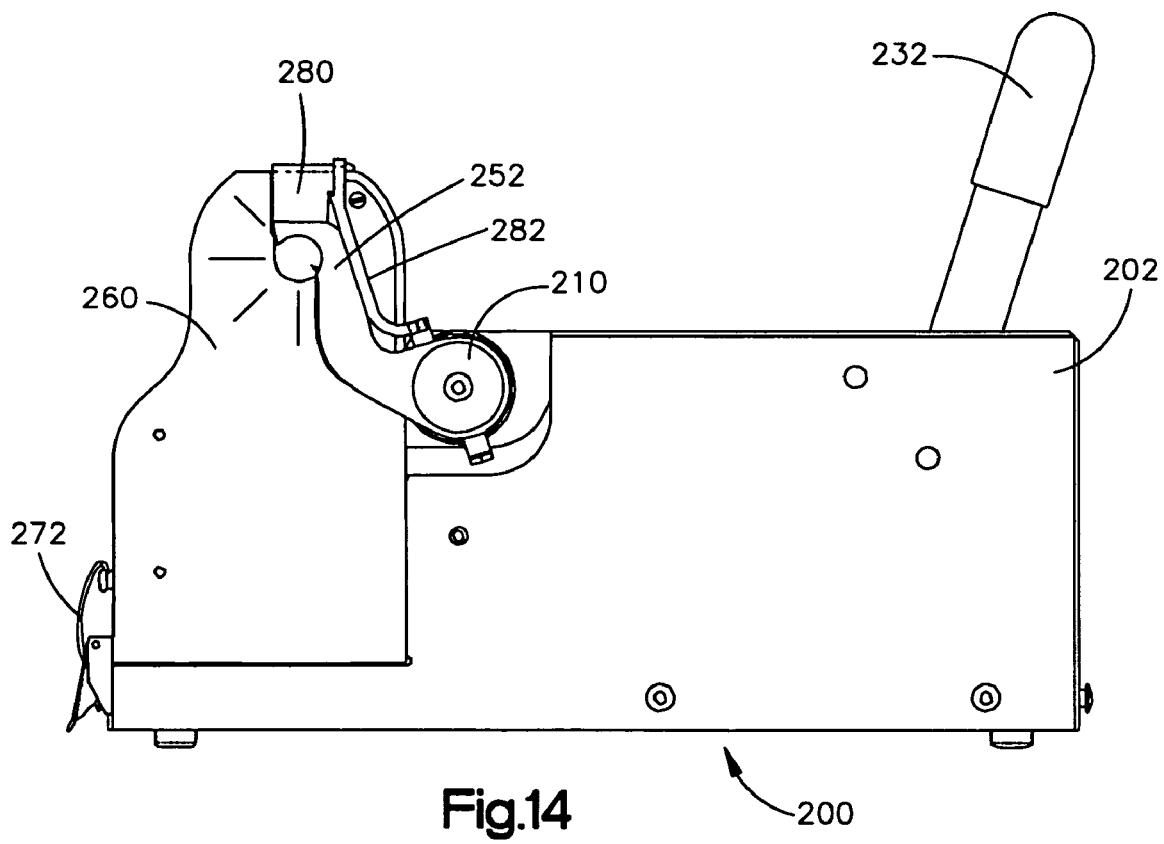
Figure 15:
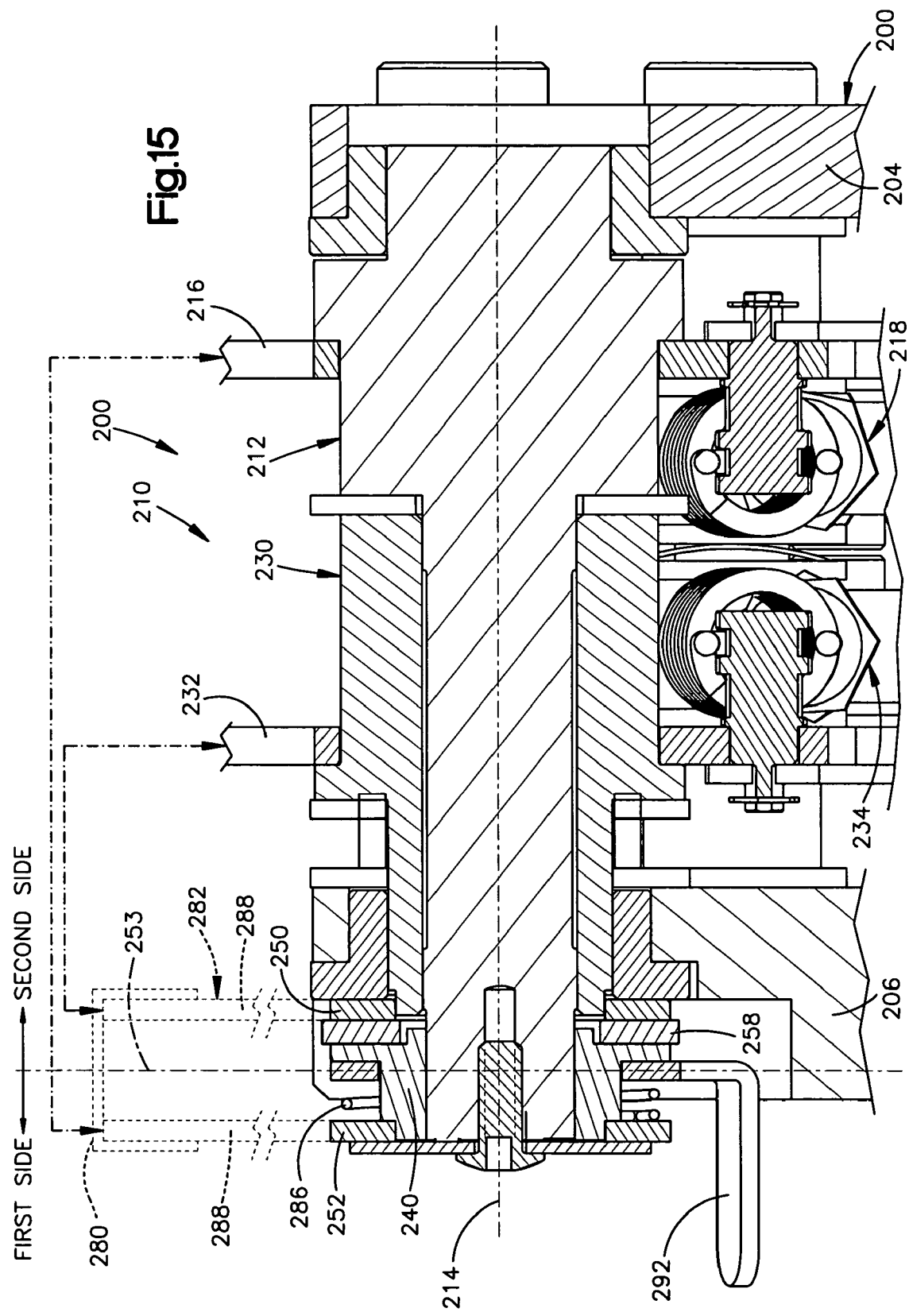
FIG. 15 is a sectional view of a clamp drive assembly that forms part of the fixture of FIG. 9.

The fixture 200 includes an arc shield, or arc cover, 280 for shielding the user from the light energy of the welding process. The arc cover 280 is a U-shaped member that is replaceably mounted on an arc cover support 282. The cover support 282 has an annular hub portion 284, similar to the hub portions 254 of the clamp plates 250 and 252. The hub portion 284 of the cover support 282 is rotatably fitted over the hub 240. The cover support 282 is thus rotatable relative to the shaft 212. A torsion spring 286 (FIG. 18) acts to bias the arc cover 280 toward a closed position as shown in FIGS. 9 and 10.

The cover support has two parallel support arms 288 that end outward from the hub portion 284 and that terminate in a cross bar 290. The arc cover 280, itself, is clipped onto the cross bar 290 and against the support arms 288 and is thereby self-retaining on the cover support 282.

The support arms 288 of the arc cover support 282 are spaced apart from each other by a distance that is equal to the distance between the inner clamp plate 250 and the outer clamp plate 252. The cover support 282 is positioned axially on the shaft 212 such that the support arms 288 of the cover support 282 are radially outward of (behind) the clamp plates 250 and 252; the clamp plates are interposed between the cover support and the axis 214. As a result, when either one of the clamp plates 250 and 252 is pivoted away from its closed position, it engages a support arm 288 of the cover support 282, and the arc cover 280 is pivoted out of the closed position. Thus, the arc cover 280 is always opened as soon as the first clamp plate 250 and 252 of the fixture 200 is opened. Similarly, if both clamp plates 250 and 252 are in the open position, and one is then closed, the remaining (open) clamp plate holds the arc cover 280 in its open position. The arc cover 280 does not move back to its closed position until both clamp plates 250 and 252 are pivoted closed.

The arc cover support 282 includes a manually engageable arm 292 that projects axially from the hub portion 284. The arm 292 is engageable to enable manual pivoting of the arc cover 280 between the closed position and the open position, without moving either of the clamp plates 250 and 252. In this manner, the work area can be viewed without disturbing the clamping of the workpieces.

The direct actuation of the arc cover support 282 by the clamp plates 250 and 252, enables the fixture 200 to do without the more complex actuation mechanism found in the fixture 10 of the first embodiment. In addition, the fixture 200 does not need structure corresponding to the longitudinal rail 82 of the base 12 of the fixture 10. As a result, more space is available for workpieces being welded in the fixture.

We therefore claim as part of our invention, among other aspects, the weld fixture having opposite handles for actuating the two movable clamp plates; the pivoting base assembly; the clamp drive assembly with coaxial shaft and sleeve for the two clamp plates; the sliding or pivoting arc cover with actuating mechanism; and the configuration of the parts as described that maximizes the space available for workpieces.

FIGS. 21-24 illustrate portions of an exemplary workpiece support system 300 that can be used with, or as part of, a welding fixture of the present invention. The system 300 is shown as associated with a fixture 302; the system can be used with, or as a part of, other welding fixtures.

If a workpiece is other than a short tube, it can be too heavy to be supported in a correctly aligned position at the welding location without the use of one or more external supports. The workpiece support system 300 is designed to support one or both of the workpieces being welded at a welding location 316 on the fixture 302. In FIGS. 21-24, the system 300 is shown supporting a short tube 304 on the left side of the fixture 302, coaxial with the welding axis 306, and a long tube 308, at an angle to the welding axis, on the right side of the fixture.

The system 300 includes an exemplary assembly 310 shown supporting the short tube 304. The assembly 310 includes a pair of rails 312 that are screwed into the base 314 of the fixture 302. The rails 312 project outward from the left side of the fixture, below the welding location 316. The rails 312 support a pillow block 320 that is movable along the rails in a direction toward and away from the base 314. The pillow block 320 can be secured in a selected position along the rails 312 by two thumbscrews 322.

Figure 25:
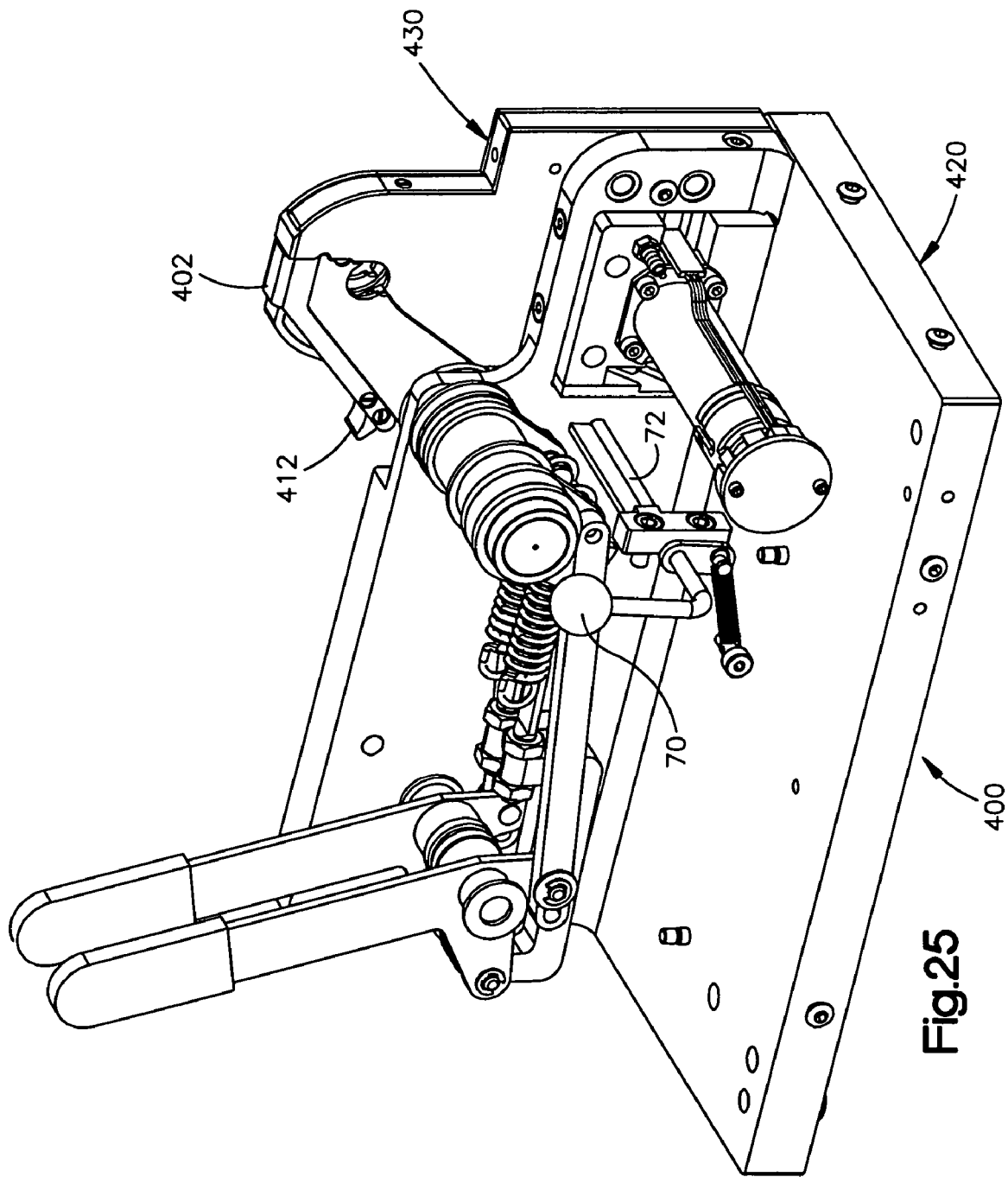
FIG. 25 is a perspective view of a welding fixture similar to the fixture shown in FIG. 9, with parts removed.

The pillow block 320 has a vertically extending slot 324 that receives a thumbscrew connector 326 for a support member 328. The support member 328 has a V-notch 330 on one end for supporting a tubular workpiece. The opposite end (not shown) of the support member 328, which is the lower end in FIG. 25, is flat for supporting a differently configured workpiece. The support member 328 can be secured in either vertical orientation with respect to the pillow block 320, so that either the V-notch 330 or the flat end portion is uppermost. The support member 328 is then fixed in position vertically with the thumbscrew connector 326.

The combination of the rails 312 and the pillow block 320 and the support member 328 provides a support for the workpiece 304 on the left side of the fixture 302, which is vertically adjustable and also adjustable inward or outward in a direction parallel to the welding axis 306.

The support system 300 also includes structure 334 for supporting the workpiece 308 on the other side of the welding location 316. The structure 334 includes another set of rails 336 that extend laterally from the right side of the fixture base 314. The rails 336 support a pillow block 340 whose position on the rails can be adjusted and set with the use of two thumbscrews 342. The pillow block 340 supports in a vertically adjustable manner one end portion 344 of a bar 346, along the welding axis 306. The other end portion 348 of the bar 346 is located adjacent the welding location 316 and is supported by a foot 350 on top of the shroud 352 of the fixture 302. The bar 346 supports the inner end of the long tube 308.

The outer end of the long tube 308 is supported by another pillow block assembly 354. This pillow block assembly 354 is located on two rails 356 that extend from the side of the pillow block 340, in a direction transverse to the rails 336 and transverse to the welding axis 300. The location of this pillow block 354 is settable and lockable by two thumbscrews 358. The pillow block 354 supports a vertically adjustable block 360 that has a V-notch on its upper end portion. The block 360 is oriented at an angle to the welding axis 306 so that it can properly support the outer end portion of the long tube 308, which is itself oriented at an angle to the workpiece axis in this particular configuration. The workpiece support system 300 with this angular feature shown is merely illustrative; a workpiece support system in accordance with the invention can include one or more units arranged in differing configurations, on one or both sides of the fixture.

Figure 23:
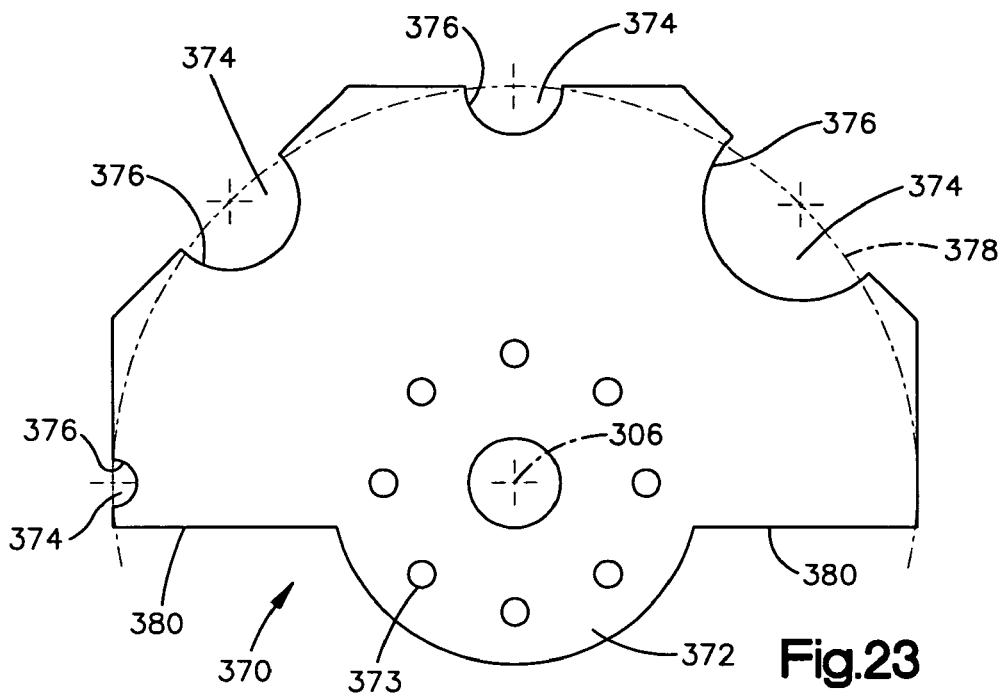
FIG. 23 is a schematic view of a workpiece support turret that forms part of the workpiece support system of FIG. 22.
Figure 24:
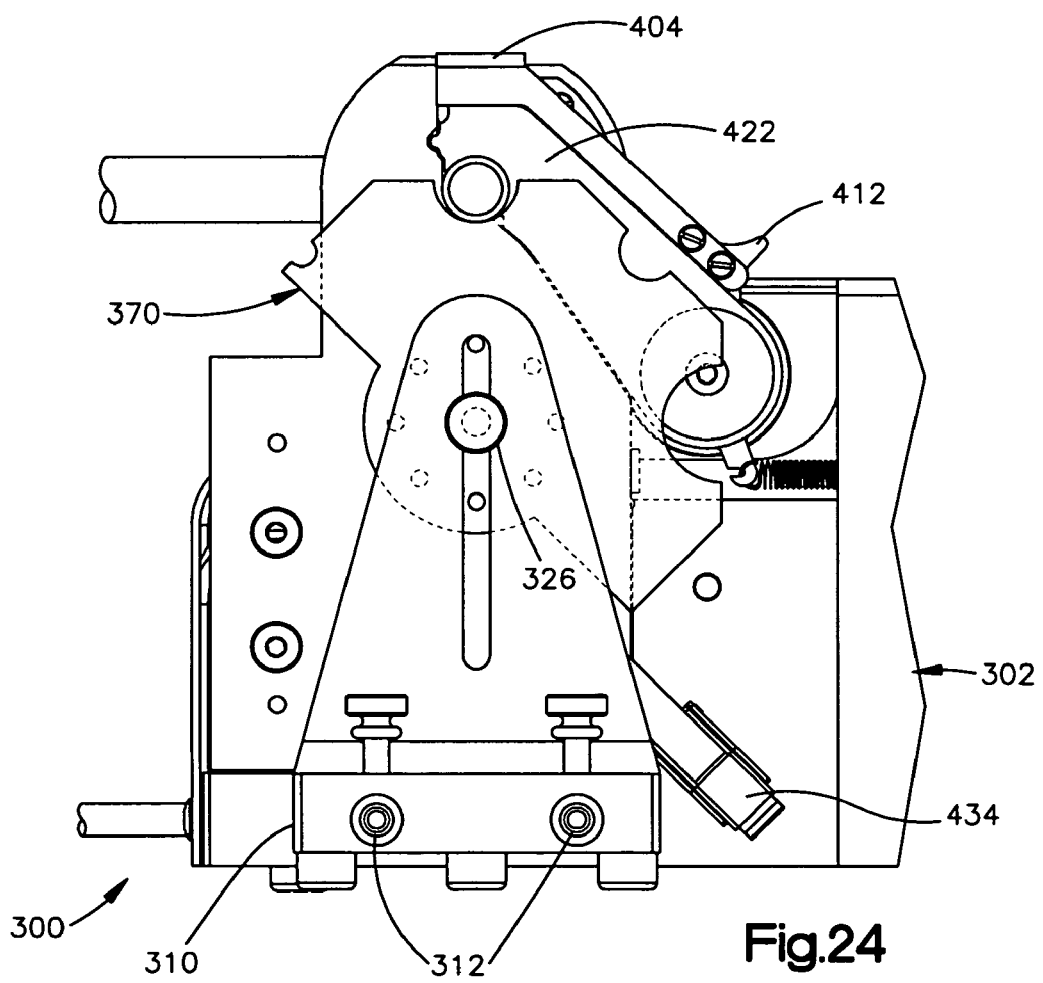
FIG. 24 is a partial elevational view of the workpiece support system of FIG. 22.

FIGS. 23 and 24 illustrate schematically another portion of the system, specifically, a turret 370 that can support a plurality of tubes of different sizes (diameters). The turret 370 has a generally disc shaped configuration with a central mounting portion 372 that is adapted to be connected with the pillow block 310. When so connected the turret 370 is rotatable on the pillow block 310. Its rotational position can be set by detents 373. The vertical position of the turret 370 can be set with the thumbscrew adjuster mechanism 326 of the pillow block 310.

A one hundred eighty degree sector of the circumference of the turret 370 has a scalloped configuration including a plurality of arcuate notches 374. The notches 374 are of differing diameters. Each one of the notches 374 is defined by a respective arcuate surface 376 centered on an imaginary circle 378 that is itself centered on the welding axis 306. As a result, each one of the notches 374 is adapted to receive and support a tubular workpiece that is centered on the welding axis 306, without having to move vertically either the workpiece or the turret 370. The opposite one hundred eighty degree sector of the circumference of the turret 370 has two flats 380 for supporting planar or other non-tubular workpieces.

FIGS. 25-28 illustrate portions of another exemplary welding fixture 400 that includes several components that are configured differently from corresponding components in the welding fixtures described above. The components shown in FIGS. 25-28 are usable separately or in combinations with any welding fixture of the present invention.

FIGS. 25 and 26 are perspective views, from opposite sides, of the welding fixture 400. The arc shield 402 in the fixture 400 is differently configured and constructed than the arc shield shown in FIGS. 9-20. Specifically, the arc shield 402 includes a one piece metal shield member 404 that is secured by four screws 406 to a hub 408. The shield member 404 is removable and replaceable as one piece. The hub 408 is supported for rotation about an axis 410. A finger tab 412 on the hub 408 is manually engageable to enable the arc shield to be manually retracted from its closed position (shown in FIGS. 25 and 26) covering the welding location, to its open position. A spring tab 414 on the hub 408 receives one end of a coil spring 416. The coil spring 416 extends into a slot 418 in the base 420 and has its opposite end fixed to the base. The coil spring 416 acts between the arc shield 402 and the base 420 to bias the arc shield into the closed position.

In the fixture 400, the movable clamp plates 422 are differently configured than the movable clamp plates 250 and 252 shown in FIGS. 12-24. Specifically, each movable clamp plate 422 has an inner edge 424 that is substantially straight as compared to the recessed inner edge of the clamp plates 250 and 252. Thus, the width across the clamp plate 422 from its inner edge 424 to its outer edge 426 is greater, and the clamp plate 422 can be more rigid and stronger.

In the fixture 400, the side plate 430 is attached to the base 420 in a different manner. Specifically, the side plate 430, which forms the fixed jaw or fixed clamp plates on both sides of the welding plane, has two through holes 432 which can receive fasteners (not shown), such as screws or bolts, that extend parallel to the welding axis 406, for fastening the side plate to the base 420. The fasteners secure the side plate 430 in the selected position relative to the base 420. That position is set by an angled clamp 434 that acts between the base 420 and the lower outside corner 436 of the side plate 430, to pull the side plate simultaneously both down and laterally into the proper position relative to the weld head.

Having described the invention, we claim:
1. A welding fixture for supporting first and second workpieces in a coaxial relationship along a workpiece axis relative to each other, the fixture comprising:
   a base having a fixed clamping portion;
   a left clamp on the base for holding a first workpiece between the left clamp and the fixed clamping portion on a left side of a welding plane perpendicular to the workpiece axis;

a right clamp on the base for holding a second workpiece between the right clamp and the fixed clamping portion on a right side of the welding plane in a coaxial relationship with the first workpiece;

a left handle on the base for operating the right clamp; and a right handle on the base to the right of the left handle for operating the left clamp;

wherein the left clamp is movable independent of the right clamp to hold the first workpiece, and the right clamp is movable independent of the left clamp to hold the second workpiece.

2. A fixture as set forth in claim 1 wherein the left clamp is operable by contact with only the right handle to enable changing of the first workpiece and the right clamp is operable by contact with only the left handle to enable changing of the second workpiece.

3. A fixture as set forth in claim 1 wherein each one of the left and right clamps has a closed position for clamping its associated workpiece, an open position spaced a first distance from the closed position for enabling insertion and removal of the associated workpiece, and a tool change position spaced a second distance from the closed position, greater than the first distance, for enabling removal and replacement of a clamp part from the clamp.

4. A fixture as set forth in claim 3 wherein the clamp part is supported on the base for pivotal movement about an axis separate from the workpiece axis between the closed position and the open position and the tool change position.

5. A fixture as set forth in claim 3 wherein the left and right handles are normally movable only within a range for moving the clamps between the open and closed positions, and wherein the fixture also includes a manually actuatable release mechanism for releasing the left and right handles for movement past the open position to the tool change position and for holding the handles in the tool change position.

6. A fixture as set forth in claim 1 further including an orbital welder including an electrode rotatable about the workpiece axis in the welding plane to effect welding of the first and second workpieces along the welding plane.

7. A fixture as set forth in claim 1 further including an arc shield supported on the base for pivotal movement between a shielding position and a non-shielding position, the arc shield moving from the shielding position to the non-shielding position when either one of the first and second clamps is moved from a closed position to an open position, the arc shield being blocked from movement from the non-shielding position to the shielding position if either one of the first and second clamps is in the open position.

8. A fixture as set forth in claim 1 wherein the left handle and the right handle are on the same side of the welding plane as the right clamp, the left clamp being on the opposite side of the welding plane, the fixture including a mechanism for transmitting actuating force from the right handle across the welding plane to the left clamp.

9. A fixture as set forth in claim 1 including a shaft supported on the base for rotation about a pivot axis, the shaft connecting the right handle in a force-transmitting relationship with the left clamp; and a sleeve rotatable about the shaft and about the pivot axis, the sleeve connecting the left handle in a force-transmitting relationship with the right clamp.

10. A fixture as set forth in claim 1 wherein the fixture includes a tilt mechanism by which the left and right clamps and the left and right handles may be tilted relative to a base surface thereby to adjust the line of sight required to view the welding location.

11. A fixture as set forth in claim 10 wherein the tilt mechanism includes a first base plate that is tiltable upward relative to a second base plate, the left and right clamps and the left and right handles being mounted on the first base plate, the tilt mechanism also including a clamping mechanism by which the desired position of tilt of the first base plate can be set.

12. A welding fixture for supporting first and second workpieces in a coaxial relationship along a workpiece axis and on opposite sides of a welding plane relative to each other, the fixture comprising:

a base;

a first clamp on the base for holding a first workpiece;

a second clamp on the base for holding a second workpiece in a coaxial relationship with the first workpiece on an opposite side of the welding plane;

the first and second clamps including first and second movable clamp parts, respectively, that are pivotable about a pivot axis separate from the workpiece axis, a first handle on the base for operating the first clamp;

a shaft supported on the base for rotation about the pivot axis, the shaft connecting the first handle in a force-transmitting relationship with the first movable clamp part;

a second handle on the base for operating the second clamp; and a sleeve rotatable about the shaft and about the pivot axis, the sleeve connecting the second handle in a force-transmitting relationship with the second movable clamp part.

13. A fixture as set forth in claim 12 including a hub that engages and is driven by the shaft, the first clamp part engaging and being driven by the hub, and the second clamp part engaging and being driven by the sleeve.

14. A fixture as set forth in claim 13 wherein the hub has an external configuration that replicates the external configuration of the sleeve so that the first and second clamp parts can be interchangeable.

15. A fixture as set forth in claim 14 wherein the first clamp part is interchangeable with the second clamp part.

16. A fixture as set forth in claim 12 wherein the second handle and the sleeve and the second clamp part and the first handle are located on one side of the welding plane, the shaft extending past the welding plane and the first clamp part being located on the other side of the welding plane.

17. A fixture as set forth in claim 12 further including an orbital welder including an electrode rotatable about the workpiece axis in the welding plane to effect welding of the first and second workpieces along the welding plane.

18. A fixture as set forth in claim 12 further including an arc shield supported on the base for pivotal movement between a shielding position and a non-shielding position, the arc shield moving from the shielding position to the non-shielding position when either one of the first and second clamps is moved from a closed position to an open position, the arc shield being blocked from movement from the non-shielding position to the shielding position if either one of the first and second clamps is in the open position.

19. A welding fixture for supporting first and second workpieces in a coaxial relationship along an axis and on opposite sides of a welding plane perpendicular to the axis relative to each other, the fixture comprising:

a base having a fixed clamping portion;

a first clamp on the base for holding a first workpiece between the first clamp and the fixed clamping portion on a first side of the welding plane;

a second clamp on the base for holding a second workpiece between the left clamp and the fixed clamping portion in a coaxial relationship with the first workpiece on a second side of the welding plane opposite the first side;

a first handle on the base for operating the first clamp; and a second handle on the base for operating the second clamp;

wherein the first handle and the second handle are on the second side of the welding plane, the fixture including a mechanism for transmitting actuating force from the first handle across the welding plane to the first clamp; and wherein the first clamp is movable independent of the second clamp to hold the first workpiece, and the second clamp is movable independent of the first clamp to hold the second workpiece.

20. A welding fixture as set forth in claim 19 wherein the mechanism includes a coaxial sleeve and shaft arrangement, the shaft transmitting force from the first handle to the first clamp and the sleeve transmitting force from the second handle to the second clamp.

21. A welding fixture as set forth in claim 20 wherein the shaft and sleeve have respective end portions adjacent the welding location, and the mechanism includes a hub on the end portion of the shaft for increasing the diameter of the shaft to be the same as the diameter of the sleeve.

22. A welding fixture as set forth in claim 21 wherein the first clamp includes a first movable clamp part and the second clamp includes a second movable clamp part that is identical to the first movable clamp part.

23. A fixture as set forth in claim 19 further including an orbital welder including an electrode rotatable about the workpiece axis in the welding plane to effect welding of the first and second workpieces along the welding plane.

24. A fixture as set forth in claim 19 further including an arc shield supported on the base for pivotal movement between a shielding position and a non-shielding position, the arc shield moving from the shielding position to the non-shielding position when either one of the first and second clamps is moved from a closed position to an open position, the arc shield being blocked from movement from the non-shielding position to the shielding position if either one of the first and second clamps is in the open position.

25. A welding fixture for supporting first and second workpieces in a coaxial relationship along a workpiece axis relative to each other, the fixture comprising:
 a base;
 a first clamp on the base having a closed position for holding a first workpiece and having an open position;
 a second clamp on the base having a closed position for holding a second workpiece in a coaxial relationship with the first workpiece and having an open position, the second clamp being movable independently of the first clamp; and
 an arc shield supported on the base for pivotal movement between a shielding position covering the welding location and a non-shielding position,
 the arc shield moving from the shielding position to the non-shielding position when either one of the first and second clamps is independently moved from the closed position to the open position, the arc shield being blocked from movement from the non-shielding position to the shielding position if either one of the first and second clamps is in the open position.

26. A welding fixture as set forth in claim 25 wherein the first and second clamps include first and second movable clamp parts, respectively, that are independently pivotable about a pivot axis distinct from the workpiece axis to move the arc shield from the shielding position to the non-shielding position and to hold the arc shield in the non-shielding position.

27. A fixture as set forth in claim 25 further including an orbital welder including an electrode rotatable about the workpiece axis in the welding plane to effect welding of the first and second workpieces along the welding plane.

28. A fixture as set forth in claim 25 further including first and second handles for operating the first and second clamps, respectively, the second handle and the first handle being on the same side of the welding plane as the second clamp, the first clamp being on the opposite side of the welding plane, the fixture including a mechanism for transmitting actuating force from the first handle across the welding plane to the first clamp.

29. A fixture as set forth in claim 28 wherein the mechanism includes a shaft supported on the base for rotation about a pivot axis, the shaft connecting the first handle in a force-transmitting relationship with the first clamp, and a sleeve rotatable about the shaft and about the pivot axis, the sleeve connecting the second handle in a force-transmitting relationship with the second clamp.

30. Welding apparatus comprising:
 an orbital welder including an electrode rotatable around a workpiece axis in a welding plane, the welding plane being perpendicular to the workpiece axis, to effect welding of first and second workpieces along the welding plane; and
 a welding fixture for supporting the first and second workpieces in a coaxial relationship along the workpiece axis and on opposite sides of the welding plane relative to each other;
 the fixture comprising a base having a fixed clamping portion, a first clamp on the base for holding a first workpiece between the first clamp and the fixed clamping portion on a first side of the welding plane, and a second clamp on the base for holding a second workpiece between the second clamp and the fixed clamping portion and in a coaxial relationship with the first workpiece on a second side of the welding plane opposite the first side, the first clamp being configured to hold the first workpiece independent of the second clamp, and the second clamp being configured to hold the second workpiece independent of the first clamp;
 the fixture also comprising a first handle on the base for operating the first clamp, and a second handle on the base for operating the second clamp, the first handle and the second handle being on the second side of the welding plane, the fixture including a mechanism for transmitting actuating force from the first handle across the welding plane to the first clamp.

31. Apparatus as set forth in claim 30 further including an arc shield supported on the base for pivotal movement between a shielding position and a non-shielding position,
 the arc shield moving from the shielding position to the non-shielding position when either one of the first and second clamps is moved from a closed position to an open position, the arc shield being blocked from movement from the non-shielding position to the shielding position if either one of the first and second clamps is in the open position.

32. Apparatus as set forth in claim 30 wherein the mechanism includes a shaft supported on the base for rotation about a pivot axis, the shaft connecting the first handle in a force-transmitting relationship with the first clamp and a sleeve rotatable about the shaft and about the pivot axis, the sleeve connecting the second handle in a force-transmitting relationship with the second clamp.

* * * * *